（12） United States Patent
Aoshima

(10) Patent No.: US 8,773,815 B2
(45) Date of Patent: Jul. 8, 2014

(54) FLUID BEARING COMPONENT INCLUDING THRUST BEARING GROOVE RECESSES AND DISK DRIVE DEVICE INCLUDING SAME

(71) Applicant: Alphana Technology Co., Ltd., Fujieda (JP)

(72) Inventor: Hisayuki Aoshima, Fujieda (JP)

(73) Assignee: Samsung Electro-Mechanics Japan Advanced Technology Co., Ltd., Fujieda (JP)

( * ) Notice: Subject to any disclaimer, the term of this patent is extended or adjusted under 35 U.S.C. 154(b) by 0 days.

(21) Appl. No.: 13/789,600

(22) Filed: Mar. 7, 2013

(65) Prior Publication Data

US 2013/0235489 A1    Sep. 12, 2013

(30) Foreign Application Priority Data

Mar. 8, 2012  (JP) .................................. 2012-051667

(51) Int. Cl.
*G11B 19/20*    (2006.01)

(52) U.S. Cl.
USPC ........ 360/99.08; 360/98.07; 310/90; 384/112

(58) Field of Classification Search
USPC ........ 360/98.07, 99.08; 310/90; 384/107, 112
See application file for complete search history.

(56) References Cited

U.S. PATENT DOCUMENTS

| | | | | |
|---|---|---|---|---|
| 6,313,967 B1 * | 11/2001 | Bodmer et al. | ............ | 360/98.07 |
| 6,493,181 B1 * | 12/2002 | Ichiyama | .................. | 360/99.08 |
| 7,531,928 B2 * | 5/2009 | Yamamoto | ...................... | 310/90 |
| 8,085,495 B2 * | 12/2011 | Kumoi et al. | .............. | 360/99.08 |
| 2008/0137229 A1 * | 6/2008 | Nakamura et al. | ......... | 360/99.08 |
| 2010/0080673 A1 | 4/2010 | Von der Waydbrink et al. | | |
| 2010/0195248 A1 * | 8/2010 | Yamada et al. | ............... | 360/129 |
| 2013/0215531 A1 * | 8/2013 | Yamada et al. | ............ | 360/99.08 |

FOREIGN PATENT DOCUMENTS

JP    2010-131732 A    6/2010
JP    2011-153705 A    8/2011

* cited by examiner

*Primary Examiner* — Jefferson Evans
(74) *Attorney, Agent, or Firm* — Holtz, Holtz, Goodman and Chick, PC

(57) ABSTRACT

An example rotating device is a disk drive device that includes a base, a hub on which a recording disk is to be mounted and which rotates relative to the base, and a fluid dynamic bearing unit that allows the hub to rotate relative to the base. The fluid dynamic bearing unit includes a shaft that performs relative rotation and a cylindrical member that encircles the shaft, the cylindrical member includes a thrust dynamic pressure generating groove which is provided in one end face of the cylindrical member and which generates thrust dynamic pressure, and the thrust dynamic pressure generating groove includes a cut-and-machined face.

20 Claims, 18 Drawing Sheets

FLUID BEARING COMPONENT INCLUDING THRUST BEARING GROOVE RECESSES AND DISK DRIVE DEVICE INCLUDING SAME

BACKGROUND OF THE INVENTION

1. Field of the Invention

The present invention relates to a rotating device having a thrust fluid dynamic pressure bearing, a manufacturing method of the rotating device, and a bearing component thereof.

2. Description of the Related Art

Rotating devices like hard disk drives are becoming compact and increasing the capacity, and loaded in various electronic devices. In particular, loading of disk drive devices in portable electronic devices, such as a laptop computer and a portable music player, is advancing. Rotating devices like disk drive devices loaded in such portable electronic device need thinning and weight saving, and also improvement of the rigidity of the rotating devices in order to withstand against a vibration at the time of carrying in comparison with the rotating devices loaded in a stationary electronic device like a desktop computer. In general, thinning of rotating devices and improvement of the rigidity thereof are in a trade-off relationship.

The inventor of the present invention propose, in JP 2011-153705 A, a rotating device that has an improvement in an efficiency of collecting the lubricant in a thrust dynamic pressure generating part, thereby enhancing the dynamic pressure. The rotating device of JP 2011-153705 A includes thrust dynamic pressure patterns formed by pressing a mold against a patterning target, such as a rotating body or a stationary body. According to such a rotating device, the collapsing of the shapes of the concavities of the formed thrust dynamic pressure pattern and the convexities thereof and the unevenness in height of those concavities and convexities can be suppressed.

In order to downsize the rotating device having a dynamic pressure generation part, a component configuring the dynamic pressure generating part may be downsized. When, however, the dynamic pressure generating part is downsized, the area of the dynamic pressure generating part is reduced, and thus the bearing rigidity decreases. This results in a negative effect to the shock resistance of the rotating device and the vibration resistance thereof. Such rotating devices have a stationary body and a rotating body, and when the bearing rigidity decreases, respective faces of the stationary body and the rotating body in the rotation axis direction may contact with each other when a shock like falling is applied to the rotating devices. When the rotating body contacts the stationary body, the performance is deteriorated, contact sounds are produced, or the contacting portion is worn out, resulting in the reduction of the lifetime of the rotating devices.

In order to compensate such a reduction of the bearing rigidity, a gap with the dynamic pressure generating part may be reduced. When, however, the gap is reduced, the bearing loss increases, and power consumption may increase in some cases. Alternatively, the dynamic pressure generating part may be deformed by processing pressure when the dynamic pressure generating part is processed. For example, when a mold is pressed against an end face of a cylindrical member having an inner circumferential surface that encircles a shaft and retains the shaft therein in the axial direction, a deformation such that the inner circumferential surface of that member expands inwardly may occur. When a radial dynamic pressure generating groove is formed in this inner circumferential surface, the radial dynamic pressure generating groove may be deformed, which may negatively affect the formation of dynamic pressure. Moreover, when the inner circumferential surface is deformed, the inner circumferential surface and the retained shaft highly possibly contact with each other during a relative rotation. When a contact occurs during a rotation, it may be a cause of the deterioration of the performance, a generation of contact sounds, or a worn-out of the contacting portion. Furthermore, when a work is carefully carried out so as not to cause the inner circumferential surface to be deformed, the work efficiency becomes poor.

In order to compensate such a reduction of the bearing rigidity, a groove pattern that can efficiently generate dynamic pressure may be derived through a computer simulation and employed. An example groove pattern derived through a computer simulation has a change in the width of the groove and the depth thereof. Another example groove pattern derived through a computer simulation has the groove pattern miniaturized in comparison with conventional technologies. However, according to the conventional manufacturing technologies, it is difficult to stably produce a groove having a width and a depth changed and a groove employing a miniaturized structure. Alternatively, the processing of the groove in such a shape needs a large labor work, resulting in a decrease of the work efficiency.

Such disadvantage is not only for rotating devices loaded in portable electronic devices, but also for rotating devices loaded in electronic devices of other kinds.

The present invention has been made in view of such circumstances, and it is an object of the present invention to provide a rotating device including a thrust dynamic pressure generating groove that can suppress a reduction of a bearing rigidity and a manufacturing method thereof and a bearing component.

SUMMARY OF THE INVENTION

To accomplish the above object, a first aspect of the present invention provides a bearing component that includes: a cylindrical member comprising a thrust dynamic pressure generating groove which is provided in one end face of the cylindrical member and which generates thrust dynamic pressure, and the thrust dynamic pressure generating groove comprising a cut-and-machined face.

To accomplish the above object, a second aspect of the present invention provides a bearing component that includes: a cylindrical member including a thrust dynamic pressure generating groove which is provided in one end face of the cylindrical member and which generates thrust dynamic pressure, the thrust dynamic pressure generating groove including a cut-and-machined face, the cylindrical member further includes a radial dynamic pressure generating groove which is provided in an inner circumferential surface of the cylindrical member, the thrust dynamic pressure generating groove being a set of intermittent recesses formed intermittently continuous from one another along a spiral line that gradually increases a radius for each turn from an inner circumference to an outer circumference, and the adjoining intermittent recesses being disposed so as to partially overlap in a radial direction.

To accomplish the above object, a third aspect of the present invention provides a disk drive device that includes: a base; a hub on which a recording disk is to be mounted and which rotates relative to the base; and a fluid dynamic bearing unit that allows the hub to rotate relative to the base, the fluid dynamic bearing unit including a shaft that performs relative rotation and a cylindrical member that encircles the shaft, the cylindrical member including a thrust dynamic pressure generating groove which is provided in one end face of the cylindrical member and which generates thrust dynamic pressure, and the thrust dynamic pressure generating groove including a cut-and-machined face.

Any combination of the above-explained components and replacement of the component of the present invention and the expression thereof between a method, a device, and a system, etc., are also advantageous as an aspect of the present invention.

According to the present invention, it becomes possible to provide a rotating device including a thrust dynamic pressure generating groove that can suppress a reduction of a bearing rigidity and a manufacturing method thereof and a bearing component.

DETAILED DESCRIPTION OF THE PREFERRED EMBODIMENT

Figure 1:
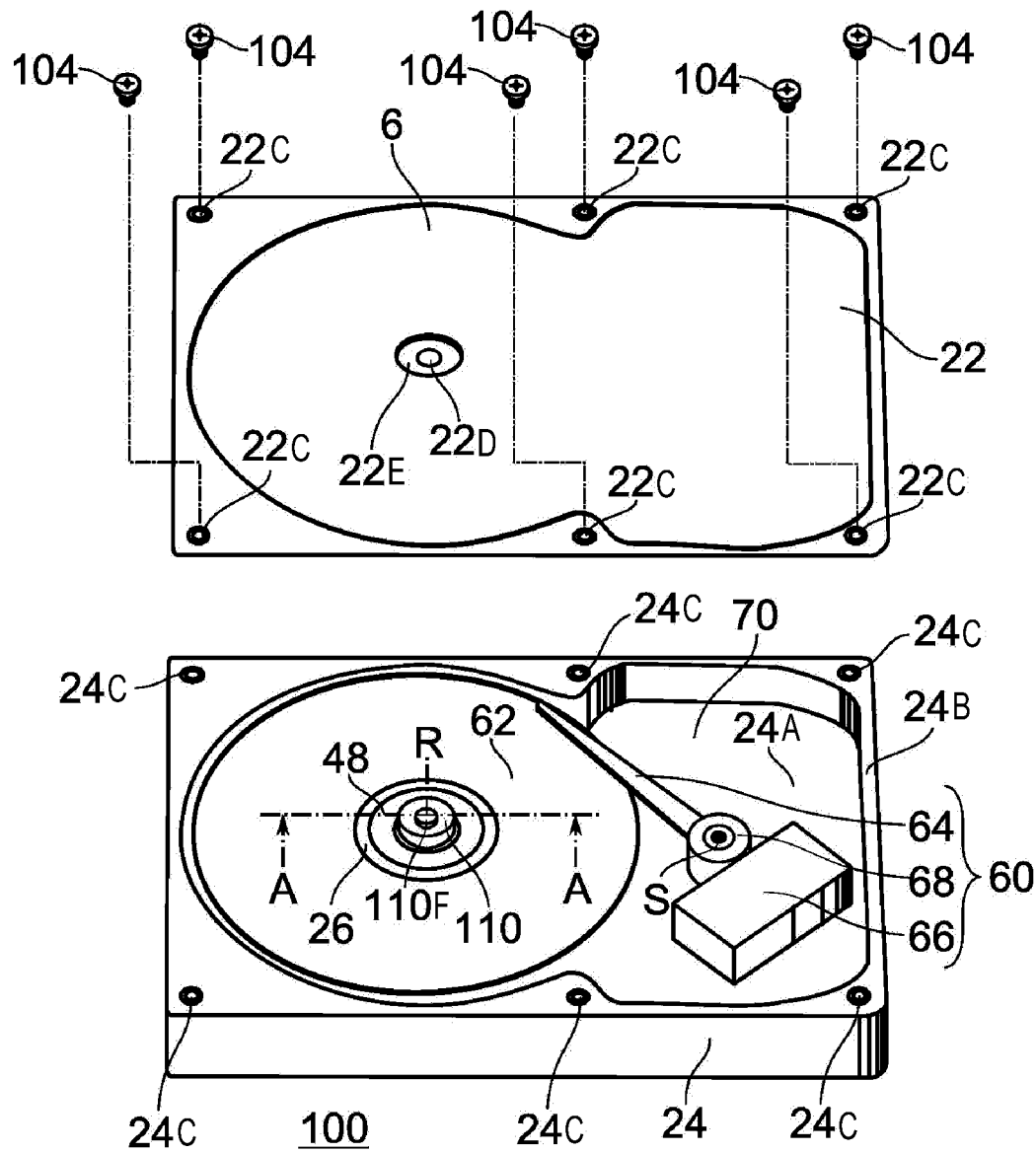
FIG. 1 is an exploded perspective view illustrating a rotating device according to an embodiment of the present invention.

A preferred embodiment of the present invention will be explained below with reference to the accompanying drawings. The same or equivalent component illustrated in the respective figures will be denoted by the same reference numeral, and the duplicated explanation thereof will be omitted accordingly. The dimension of a component in each figure is indicated in an enlarged or scale-down manner as needed in order to facilitate understanding to the present invention. A part of a component not important to explain an embodiment of the present invention in each figure will be omitted.

A rotating device according to an embodiment is suitably used as a disk drive device like a hard disk drive on which a magnetic recording disk magnetically recording data is to be mounted and which rotates and drives such a magnetic recording disk. In particular, it is suitably used as a fastened-shaft disk drive device which has a shaft fastened to a base and which has a hub rotating relative to the shaft. It is also suitably used as a shaft-rotating disk drive device which has a shaft fastened to a hub and which allows the shaft to rotate relative to a base.

For example, this rotating device may include a rotating body that is attached to a stationary body in a freely rotatable manner through a bearing unit. The bearing unit may include a thrust bearing unit formed in either one of the stationary body and the rotating body. For example, the thrust bearing unit may include a thrust dynamic pressure generating groove that is a set of intermittent recesses. For example, the bearing unit may produce dynamic pressure to a lubricating medium. For example, the lubricating medium may be a lubrication fluid.

For example, the rotating body may include a loading unit on which a drive-target medium like a magnetic recording disk is loaded. For example, the bearing unit may include a radial dynamic bearing unit that is provided in either one of the stationary body and the rotating body. For example, the radial dynamic bearing unit may include a radial dynamic pressure generating groove that is a set of intermittent recesses. For example, the radial dynamic pressure generating groove may be formed in a component in which the thrust dynamic pressure generating groove is formed. For example, the thrust bearing unit may be provided at a location encircling the radial bearing unit. For example, the rotating device may include a rotating-driving unit that applies rotation torque to the rotating body. For example, the rotating-driving unit may be a brush-less spindle motor. For example, this rotating-driving unit may include coils and a magnet.

(Embodiment)

FIG. 1 is a perspective view illustrating a rotating device 100 according to an embodiment of the present invention. FIG. 1 illustrates a condition in which a top cover 22 is detached in order to facilitate understanding to the present invention. The rotating device 100 includes a base 24, an upper shaft member 110, a hub 26, a magnetic recording disk 62, a data reader/writer 60, the top cover 22, and for example, six screws 104.

In the following explanation it is defined that a side where the hub 26 is mounted on the base 24 is an upper side. Moreover, a direction along a rotation axis R of a rotating body, an arbitrary direction passing through the rotation axis R on a plane orthogonal to the rotation axis R, and an arbitrary direction on that plane are defined as an axial direction, a radial direction, and a planar direction, respectively.

The magnetic recording disk 62 is, for example, a 2.5-inch magnetic recording disk formed of glass and having a diameter of 65 mm. The magnetic recording disk 62 has a center hole with a diameter of, for example, 20 mm, and has a thickness of, for example, 0.65 mm. The hub 26 carries, for example, one magnetic recording disk 62. The magnetic recording disk 62 is fastened to the hub 26 by, for example, unillustrated clamper. The magnetic recording disk 62 may be held between the clamper and the hub 26. The clamper may be fastened by, for example, allowing the inner circumferential surface to be engaged with a circumferential groove 26G of the hub 26 to be discussed later.

The base 24 is formed by performing die-cast molding on an aluminum alloy. The base 24 includes a bottom plate 24A that forms the bottom of the rotating device 100, and an outer circumferential wall 24B formed along the outer circumference of the bottom plate 24A so as to surround an area where the magnetic recording disk 62 is to be mounted. The outer circumferential wall 24B has, for example, six screw holes 24C provided in the top face.

The data reader/writer 60 includes a recording/playing head (unillustrated), a swing arm 64, a voice coil motor 66, and a pivot assembly 68. The recording/playing head is attached to the tip of the swing arm 64, records data in the magnetic recording disk 62, or reads the data therefrom. The pivot assembly 68 supports the swing arm 64 in a swingable manner to the base 24 around a head rotating shaft S. The voice coil motor 66 allows the swing arm 64 to swing around the head rotating shaft S to move the recording/playing head to a desired location over the top face of the magnetic recording disk 62. The voice coil motor 66 and the pivot assembly 68 are configured by conventionally well-known technologies of controlling the position of a head.

The top cover 22 is a thin plate formed in a substantially rectangular shape, and has, for example, six screw throughholes 22C provided at the periphery of the top cover 22, a cover recess 22E, and an engagement hole 22D provided at the center of the cover recess 22E. The top cover 22 is formed by, for example, pressing an aluminum plate or an iron-steel plate into a predetermined shape. A surface processing like plating may be applied on the top cover 22 in order to suppress corrosion. The top cover 22 is fastened to the top face of the outer circumferential wall 24B of the base 24 by, for example, the six screws 104. The six screws 104 correspond to the six screw holes 24C, respectively. In particular, the top cover 22 and the top face of the outer circumferential wall 24B are fastened with each other so as to suppress a leak into the interior of the rotating device 100 from the joined portion of the top cover 22 and the top face of the outer circumferential wall 24B. The interior of the rotating device 100 is, more specifically, a clean space 70 surrounded by the bottom plate 24A of the base 24, the outer circumferential wall 24B of the base 24, and the top cover 22. This clean space 70 is designed so as to be fully sealed, i.e., so as not to have a leak-in from the exterior and a leak-out to the exterior. The clean space 70 is filled with clean air having particles eliminated. Hence, foreign materials like the particles are prevented from sticking to the magnetic recording disk 62, thereby improving the reliability of the operation of the rotating device 100. The engagement hole 22D of the top cover 22 is engaged and joined with a cylindrical convexity 110F of the upper shaft member 110.

Figure 2:
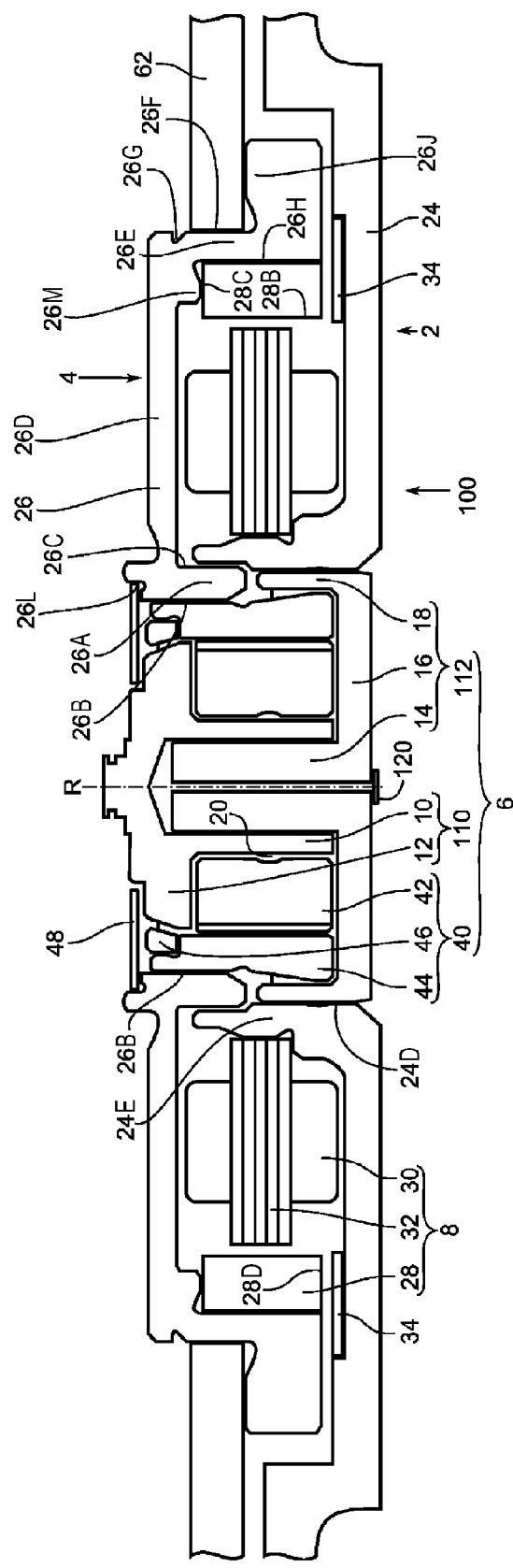
FIG. 2 is a cross-sectional view illustrating a cross section taken along a line A-A in FIG. 1.
Figure 3:
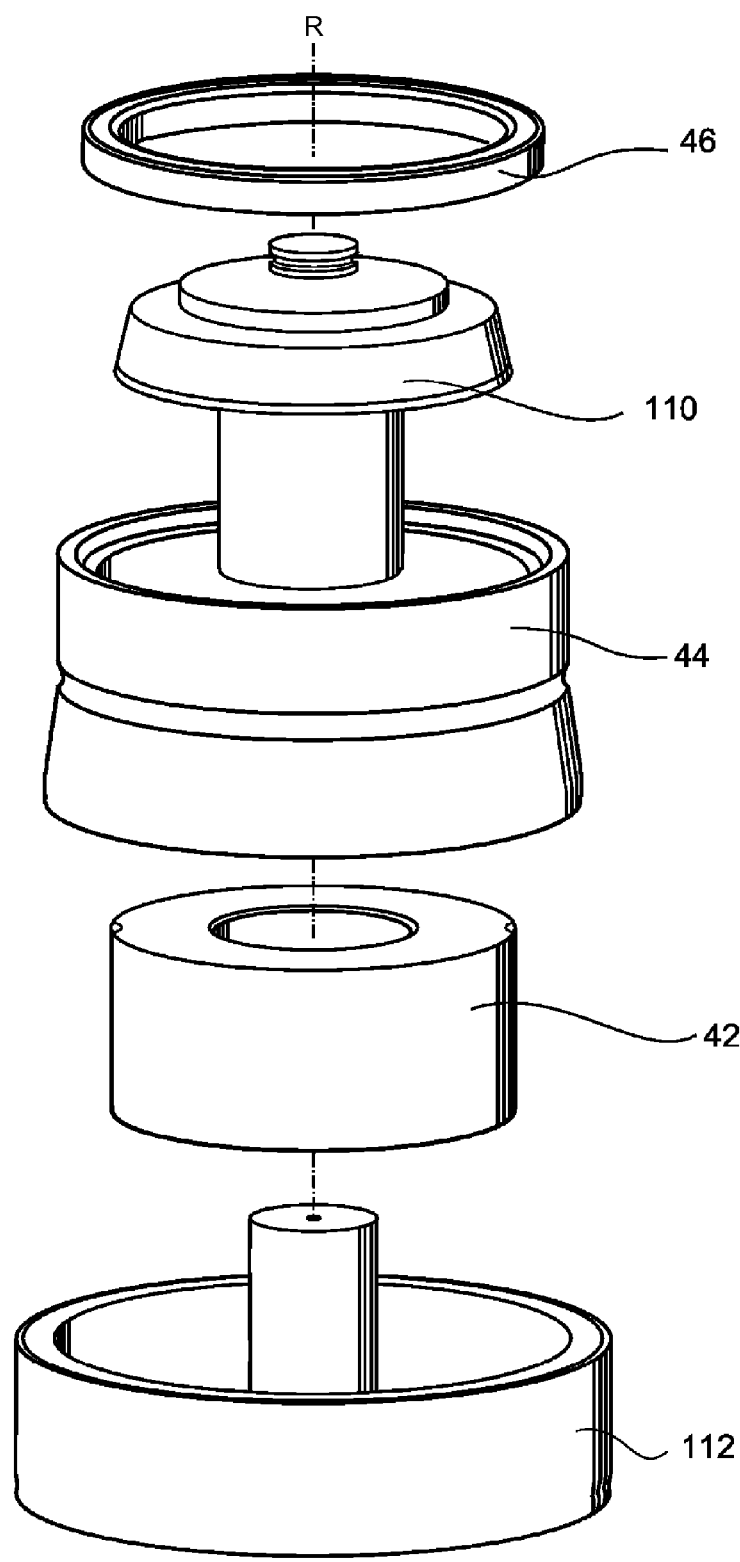
FIG. 3 is an exploded perspective view illustrating major components of a fluid dynamic bearing unit illustrated in FIG. 2.

FIG. 2 is a cross-sectional view taken along a line A-A in FIG. 1. FIG. 3 is an exploded perspective view illustrating the major components of a fluid dynamic bearing unit illustrated in FIG. 2. FIG. 2 is symmetrical along the rotation axis R, and either right or left reference numeral for the same component will be omitted in some cases in the figure.

With reference to FIG. 2, a stationary body 2 includes the upper shaft member 110, a lower shaft member 112, a stator core 32, coils 30, and a magnetic ring 34. The upper shaft member 110 includes an upper rod 10 and an upper flange 12. The lower shaft member 112 includes a lower rod 14, a lower flange 16, and a flange encircling member 18.

A rotating body 4 includes a shaft encircling member 40, a cap 48, and a cylindrical magnet 28. A lubricant 20 is continuously present in several spaces between the rotating body 4 and the stationary body 2. The shaft encircling member 40 includes a sleeve 42, a cylindrical member 44, and a ring member 46.

The base 24 is formed with an opening 24D around the rotation axis R of the rotating body 4, and includes an annular protrusion 24E encircling the opening 24D. The protrusion 24E protrudes toward the hub 26 from the upper face of the base 24.

The stator core 32 includes an annular part and, for example, 12 salient poles running outwardly of the radial direction from the annular part, and is fastened to, for example, an outer circumferential surface of the protrusion 24E at the upper-surface side of the base 24. The stator core 32 can be joined with the base 24 by press-fitting, bonding or a combination thereof. The stator core 32 is formed by, for example, laminating five electromagnetic steel sheets each with a thickness of 0.2 mm and joining those sheets together by caulking. A skin layer is provided on the surface of the stator core 32. Insulation painting, such as electrodeposition coating or a power coating, is applied on the surface of the stator core 32. The coil 30 is wound around each salient pole of the stator core 32. When, for example, a three-phase substantially sinusoidal waveform drive current is caused to flow through the coils 30, field magnetic field is produced along the respective salient poles.

The magnetic ring 34 is coaxial with the magnet 28 along the rotation axis R, and is firmly fastened to the upper face of the base 24 by, for example, bonding, caulking or a combination thereof. The magnetic ring 34 is in a hollow ring shape that is thin in the axial direction, and is formed by pressing, for example, a ferrous sheet with soft magnetism. The magnetic ring 34 has an area facing with a bottom face 28D of the magnet 28 in a non-contact manner therewith in the axial direction, and applies downward suction force to the magnet 28. This structure suppresses a floating of the rotating body 4 in the axial direction when the rotating body 4 is rotating.

The hub 26 includes a hollow first annular part 26A, a disk part 26D extending outwardly of the radial direction from an outer circumferential surface 26C of the first annular part 26A, a second annular part 26E extending downwardly of the axial direction from the outer circumference of the disk part 26D, and a mount part 26J extending outwardly of the radial direction from a lower outer circumferential surface 26F of the second annular part 26E. The hub 26 is formed in a substantially cup shape. The first annular part 26A, the disk part 26D, the second annular part 26E, and the mount part 26J are formed coaxially with each other along the rotation axis R. The first annular part 26A, the disk part 26d, the second annular part 26E, and the mount part 26J are formed together as a single piece. Any part may be formed separately and joined with the other parts. The hub 26 is formed of a ferrous material with soft magnetism like SUS 430F. The outer circumferential surface 26F of the second annular part 26E of the hub 26 is engaged with the inner circumferential surface of the magnetic recording disk 62 in a doughnut shape. The magnetic recording disk 62 is to be mounted on the top of the mount part 26J of the hub 26. The circumferential groove 26G recessed inwardly of the radial direction is formed annularly in the outer circumferential surface 26F of the second annular part 26E. The circumferential groove 26G is located above the top face of the magnetic recording disk 62 in the axial direction when the magnetic recording disk 62 is mounted on the hub 26. For example, an inner circumference of the clamper may be fitted and fastened to the circumferential groove 26G. A protrusion 26M protruding downwardly of the axial direction is provided on the lower face of the disk part 26D at the outer circumferential side. A recess 26I recessed outwardly of the radial direction is provided annularly at the upper part of an inner circumferential surface 26B of the first annular part 26A.

The magnet 28 is in a hollow ring shape, and has an outer circumferential surface fastened to an inner circumferential surface 26H of the hub 26 by, for example, bonding. An upper face 28C contacts the protrusion 26M of the hub 26. 16 drive magnetic poles are provided at an inner circumferential surface 28B in the circumferential direction by magnetization. The magnet 28 is formed of a material containing, for example, neodymium, iron, or boron. The magnet 28 may contain a resin at a predetermined percentage. The magnet 28 may be formed of a material containing a ferrite magnetic material, or may be formed by laminating a layer containing a ferrite magnetic material and another layer containing a rare-earth material like neodymium. A skin layer is provided on the surface of the magnetic layer of the magnet 28. For example, electrodeposition coating or spray painting is applied on the surface of the magnet 28. The provided skin layer suppresses an oxidization of the magnet, or suppresses a peeling of the surface of the magnet.

Figure 4:
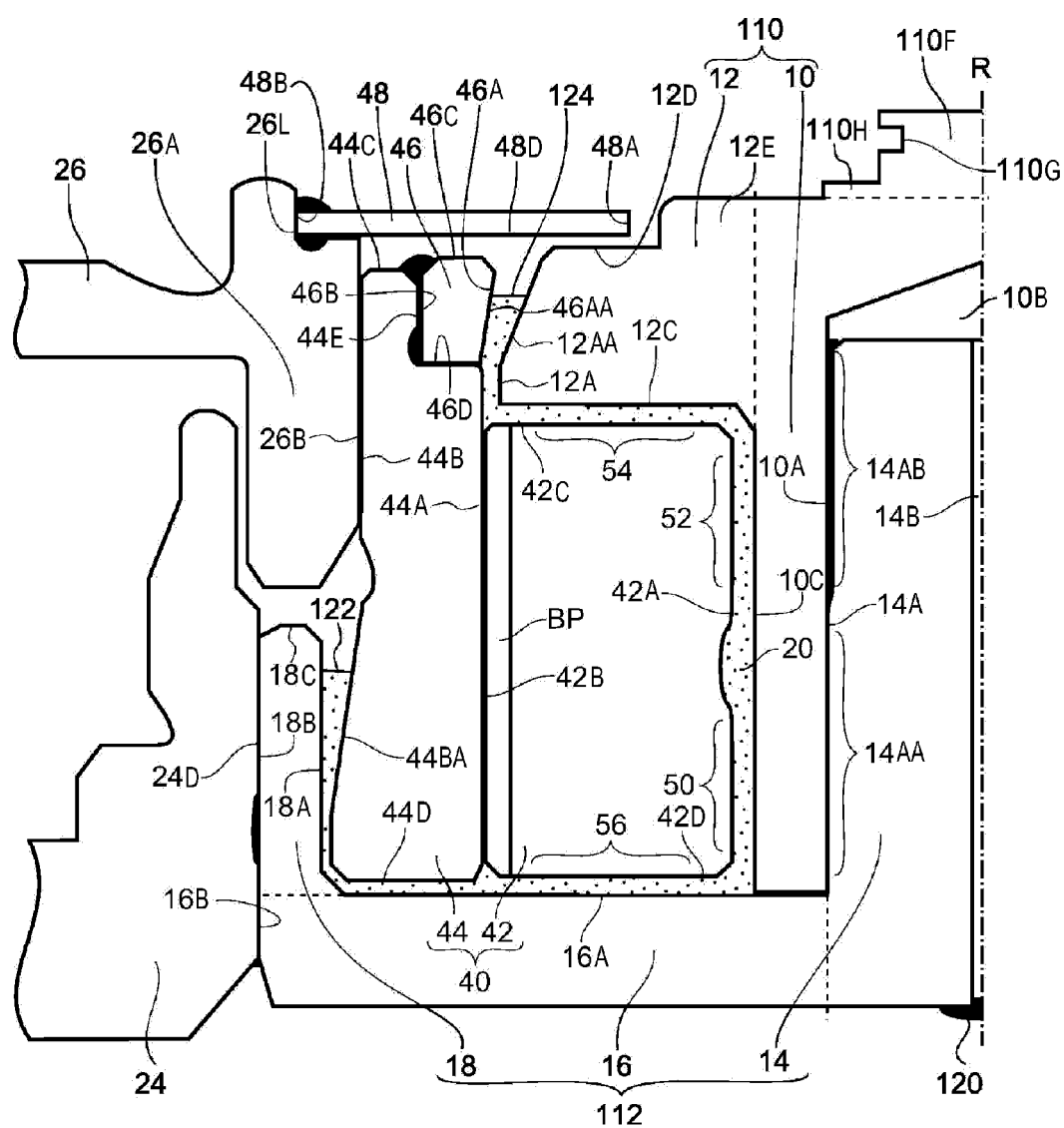
FIG. 4 is an enlarged cross-sectional view illustrating the periphery of an area where a lubricant is present in FIG. 2 in an enlarged manner.

An explanation will be given of the fluid dynamic bearing unit with reference to FIG. 4. FIG. 4 is an enlarged cross-sectional view illustrating the periphery of an area where the lubricant 20 is present in FIG. 2 in an enlarged manner. FIG. 4 illustrates only the left part relative to the rotation axis R.

The lower shaft member 112 includes a lower rod 14 in a rod shape having a through-hole 14B formed in the center thereof, a lower flange 16 in a disk shape extending outwardly of the radial direction from the lower end of an outer circumferential surface 14A of the lower rod 14, and a flange encircling member 18 in a cylindrical shape protruding upwardly of the axial direction from the outer circumferential edge of the lower flange 16. The lower shaft member 112 is in a cup shape having a rod provided at a center thereof in a standing manner (see FIG. 3). For example, the lower shaft member 112 has the lower rod 14, the lower flange 16, and the flange encircling member 18 formed together as a single piece. In this case, the production error of the lower shaft member 112 can be reduced, and the labor work for joining those members can be eliminated. Alternatively, the lower shaft member 112 can be prevented from being deformed by a shock and a load. For example, the lower shaft member 112 is formed by cutting and machining a metallic material like SUS 303. The lower shaft member 112 may be formed of other materials like a resin, and may be formed by other techniques, such as pressing and molding. The lower shaft member 112 has an outer circumferential surface 18B of the flange encircling member 18 and an outer circumferential surface 16B of the lower flange 16 bonded to the inner circumferential surface of the opening 24D, thereby being fastened to the base 24. The lower rod 14 has a passage cover 120 that covers the lower end of the through-hole 14B. For example, the passage cover 120 is formed by applying a sealant around the lower end of the through-hole 14B and the edge thereof, and letting such a sealant to be cured. The passage cover 120 may be formed by bonding and fastening a sheet formed of, for example, a metallic material or a resin material. For example, an upper end 18C of the flange encircling member 18 is located at or above an area where a first dynamic pressure generating groove 50 to be discussed later is provided in the axial direction. This structure increases the volume of a space between an inner circumferential surface 18A of the flange encircling member 18 and an outer circumferential surface of the shaft encircling member 40 to be discussed later, thereby increasing the volume of the retainable lubricant 20. The increase of the retained lubricant 20 reduces the possibility that a failure occurs due to the lack of the lubricant 20.

The upper shaft member 110 includes an upper rod 10 in a rod shape having a retainer hole 10A formed in the center thereof and retaining the lower rod 14, and an upper flange 12 in a substantially disk shape extending outwardly of the radial direction from the upper end of an outer circumferential surface 10C of the upper rod 10. The upper shaft member is in a substantially mushroom shape (see FIG. 3). The upper shaft member 110 includes the cylindrical convexity 110F at an upper end of the upper rod 10 and protruding in a cylindrical shape upwardly of the axial direction. For example, the upper shaft member 110 has the upper rod 10, the upper flange 12, and the cylindrical convexity 110F formed together as a single piece. For example, the upper shaft member 110 may have the upper rod 10 and the cylindrical convexity 110F formed together and have the upper flange 12 formed separately but joined together. For example, the upper shaft member 110 is formed by cutting and machining a ferrous material like SUS 420 J2. For example, the upper shaft member 110 may be quenched in order to increase the hardness. For example, the upper shaft member 110 may have an outer circumferential surface 10C of the upper rod 10 and a lower face 12C of the upper flange 12 polished in order to enhance the dimensional precision. The upper shaft member 110 may be formed of other materials like a resin, and may be formed by other techniques, such as pressing and molding. The upper shaft member 110 has an upper end fastened to the top cover 22 through a method to be discussed later. The lower rod 14 is encircled by and fastened to the upper rod 10. For example, the lower rod 14 has the outer circumferential surface 14A fastened to the retainer hole 10A by a combination technique of bonding and press-fitting. In FIG. 4, a lower part of the outer circumferential surface 14A is defined as a press-fit surface 14AA, while a bonding surface 14AB having a smaller diameter than the press-fit surface 14AA is provided above the press-fit surface 14AA. A bond of, for example, anaerobic is present between the retainer hole 10A and the bonding surface 14AB.

As will be discussed later, the cylindrical convexity 110F is fitted in and bonded to the engagement hole 22D of the top cover 22, and thus the upper shaft member 110 is fastened to the top cover 22. Moreover, the top cover 22 is fastened to the base 24. According to the rotating device of this type having both ends of the shaft fastened to a chassis including the base 24 and the top cover 22, among the fastened-shaft rotating devices, the shock resistance of the rotating device and the vibration resistance thereof can be enhanced.

The upper end of the upper shaft member 110 may be fastened to the top cover 22 by other techniques than bonding, such as caulking and welding. Since no threaded screw hole to which a screw is fastened is formed in the upper end of the upper shaft member 110, a deformation of the outer circumferential surface of the upper rod 10 that occurs in the case of a structure in which a screw is engaged with a screw hole can be suppressed.

The upper rod 10 has a gas reservoir 10B provided at an upper end area of the retainer hole 10A and reserving a gas. The gas reservoir 10B is formed as a space in a substantially conical or cylindrical shape. The gas reservoir 10B is in communication with the through-hole 14B of the lower rod 14. When an uncured bond is present between the retainer hole 10A and the outer circumferential surface 14A, this bond is let cured while producing a gas of contained volatile components. However, by providing the gas reservoir 10B, the volatile component gas of the bond is efficiently discharged to the exterior through the gas reservoir 10B and the through-hole 14B. This results in a reduction of a curing time of the bond, and a reduction of a labor hour. Moreover, the passage cover 120 is provided so as to block off the through-hole 14B after a predetermined time has elapsed since such a work completes. This reduces the possibility of a leak-in of foreign materials from the through-hole 14B, the gas reservoir 10B, and the space between the upper rod 10 and the lower rod 14 to the region where the lubricant 20 is present. Moreover, in a labor work of fitting the lower rod 14 into the retainer hole 10A, air in the retainer hole 10A is discharged to the exterior through the gas reservoir 10B and the through-hole 14B, the efficiency of the fitting work improves.

The upper flange 12 includes an inclined surface 12AA provided at an outer circumferential surface 12A and having a distance in the radial direction from the rotation axis R becoming large as becoming close to the base 24. The upper flange 12 has the lower face 12C facing with an upper face 42C of the sleeve 42 of the shaft encircling member 40 to be discussed later with a gap in the axial direction. The upper flange 12 includes a terrace 12D extending inwardly of the radial direction from the upper end of the outer circumferential surface 12A, and an uplift 12E raised upwardly of the axial direction in a substantially cylindrical shape from the internal end of the terrace 12D. The cylindrical convexity 110F protrudes upwardly of the axial direction from the middle part of the uplift 12E. The cylindrical convexity 110F includes a circumferential recess 110G provided around the outer circumferential surface of the cylindrical convexity 110F. A seat 110H with which a lower surface of the top cover 22 contacts and which extends outwardly of the radial direction is provided around the cylindrical convexity 110F.

The shaft encircling member 40 encircles the upper rod 10 with a gap, and is rotatable relative to the upper rod 10. The shaft encircling member 40 is present between the upper flange 12 and the lower flange 16 with respective gaps. The shaft encircling member 40 is encircled by and fastened to the hub 26. The shaft encircling member 40 is encircled by the flange encircling member 18 of the lower shaft member 112 with a gap. According to such a structure, the hub 26 is supported in a rotatable manner relative to the base 24.

The shaft encircling member 40 includes the substantially cylindrical sleeve 42 that encircles the upper rod 10, a cylindrical member 44 in a substantially cylindrical shape that encircles and is joined with the sleeve 42, and a ring member 46 in a ring shape that is joined with an upper end part of the cylindrical member 44. The sleeve 42 and the cylindrical member 44 are each formed by, for example, cutting and machining a metallic material like brass, and applying electroless nickel plating on the surface thereof. The sleeve 42 and the cylindrical member 44 may be formed of other materials like stainless steel. For example, the sleeve 42 is joined with the cylindrical member 44 by interference fitting like press-fitting or bonding, or a combination thereof. The sleeve 42 and the cylindrical member 44 may be formed together as a single piece.

The sleeve 42 is in a substantially hollow cylindrical shape (see FIG. 3), and includes an inner circumferential surface 42A, an outer circumferential surface 42B, the upper face 42C, and a lower face 42D. The sleeve 42 has the inner circumferential surface 42A encircling the upper rod 10 with a gap. The sleeve 42 has the first dynamic pressure generating groove 50 and a second dynamic pressure generating groove 52 for generating radial dynamic pressure and provided in areas of the inner circumferential surface 42a facing with the outer circumferential surface 10C of the upper rod 10 in the radial direction. The second dynamic pressure generating groove 52 is provided above the first dynamic pressure generating groove 50 so as to be distant therefrom. The first and second dynamic pressure generating grooves 50 and 52 may be provided in the outer circumferential surface 10C of the upper rod 10 instead of the sleeve 42.

A third dynamic pressure generating groove 54 for generating thrust dynamic pressure is provided in an area of the upper face 42C of the sleeve 42 facing with the upper flange 12 in the axial direction. The third dynamic pressure generating groove 54 may be provided in an area of the lower face 12C of the upper flange 12 facing with the sleeve 42 in the axial direction instead of the sleeve 42. A fourth dynamic pressure generating groove 56 for generating thrust dynamic pressure is provided in an area of the lower face 42D of the sleeve 42 facing with the lower flange 16 in the axial direction. The fourth dynamic pressure generating groove 56 may be provided in an area of an upper face 16A of the lower flange 16 facing with the sleeve 42 in the axial direction instead of the sleeve 42.

For example, the first and second dynamic pressure generating grooves 50 and 52 are each formed in a herringbone shape. The first and second dynamic pressure generating grooves 50 and 52 may be in other shapes like a spiral shape. For example, the third and fourth dynamic pressure generating grooves 54 and 56 are each formed in a herringbone shape. The third and fourth dynamic pressure generating grooves 54 and 56 may be formed in other shapes like a spiral shape. The first and second dynamic pressure generating grooves 50 and 52 are formed by, for example, pressing, ball-rolling, etching, and cutting and machining. Those dynamic pressure generating grooves may be formed by different techniques from each other. How to form the third and fourth dynamic pressure generating grooves 54 and 56 will be explained in detail later.

The cylindrical member 44 is in a substantially hollow cylindrical shape (see FIG. 3), and includes an inner circumferential surface 44A, an outer circumferential surface 44B, an upper face 44C, a lower face 44D, and a recess 44E provided annularly at the upper end side of the inner circumferential surface 44A so as to be concaved outwardly of the radial direction. The inner circumferential surface 44A is joined with the sleeve 42. An upper part of the outer circumferential surface 44B is joined with an inner circumferential surface 26B of the first annular part 26A of the hub 26. A part of the outer circumferential surface 44B below the area joined with the hub 26 is encircled by the flange encircling member 18 with a gap. The outer circumferential surface 44B includes an inclined surface 44BA provided at an area facing with the inner circumferential surface 18A of the flange encircling member 18 in the radial direction and having a radius becoming small as coming close to the upper end of the outer circumferential surface 44B. A gap between the inclined surface 44BA and the inner circumferential surface 18A gradually becomes widespread toward the upper space in the axial direction. The inclined surface 44BA and the inner circumferential surface 18A contact a first air-liquid interface 122 of the lubricant 20 to be discussed later, and form a capillary seal that prevents the lubricant 20 from being splashed by capillary force. For example, the first air-liquid interface 122 is located at or above the area where the first dynamic pressure generating groove 50 is disposed in the axial direction. This structure enables the rotating device 1 to retain a larger amount of lubricant 20, thereby reducing the possibility of a breakdown due to the lack of the lubricant 20. For example, the first air-liquid interface 122 is provided outwardly of the third and fourth dynamic pressure generating grooves 54 and 56 in the radial direction.

The ring member 46 is in a hollow ring shape (see FIG. 3), and includes an inner circumferential surface 46A, an outer circumferential surface 46B, an upper face 46C, and a lower face 46D. The ring member 46 is formed by, for example, cutting and machining a stainless-steel material like SUS 303 or SUS 430. The ring member 46 has the outer circumferential surface 46B and the lower face 46D fitted in the recess 44E of the cylindrical member 44, and bonded and fastened thereto. The ring member 46 includes an inclined surface 46AA provided at the inner circumferential surface 46A and having a diameter that becomes small as coming close to the upper end of the inner circumferential surface 46A. The inclined surface 46AA of the ring member 46 and the inclined surface 12AA of the upper flange 12 contact a second air-liquid interface 124 of the lubricant 20 to be discussed later, and form a capillary seal that prevents the lubricant 20 from being splashed by capillary force.

The cap 48 is a hollow ring shape thin in the axial direction, and includes an inner circumferential surface 48A, an outer circumferential surface 48B, an upper face and a lower face 48D. For example, the cap 48 is formed by cutting and machining a stainless-steel material like SUS 303 or SUS 430. The cap 48 may be formed of other metallic materials or resin materials or may be formed through other techniques, such as pressing and molding. The cap 48 has the outer circumferential surface 48B fitted in the recess 26I of the inner circumferential surface 26B of the first annular part 26A of the hub 26, and bonded and joined thereto. The cap 48 has the lower face 48D covering the second air-liquid interface 124. The cap 48 has the inner circumferential surface 48A encircling the side face of the uplift 12E of the upper flange 12 in a non-contact manner. The inner circumferential side of the lower face 48D of the cap 48 faces the terrace 12D of the upper flange 12 in a non-contact manner in the axial direction. This structure causes the cap 48 and the upper flange 12 to form a labyrinth to the lubricant 20, thereby preventing the lubricant 20 from being splashed.

The lubricating medium is not limited to any particular one, and for example, conventionally well-known lubrication fluid can be applied. A structure having an air-liquid interface only at one side or a so-called partial-fill structure having the lubrication fluid non-continuously present may be employed for the lubrication fluid. In this embodiment, the lubricant 20 is applied as the lubrication fluid. The lubricant 20 is present between the rotating body 4 and the stationary body 2 continuously from the first air-liquid interface 122 to the second air-liquid interface 124. The lubricant 20 is present, for example, a space between the inclined surface 44BA and the inner circumferential surface 18A in the radial direction, a space between the cylindrical member 44 and the lower flange 16 in the axial direction, a space between the sleeve 42 and the lower flange 16 in the axial direction, a space between the sleeve 42 and the upper rod 10 in the radial direction, a space between the upper flange 12 and the sleeve 42 in the axial direction, a space between the upper flange 12 and the cylindrical member 44 in the radial direction, and a space between the inclined surface 12AA and the inclined surface 46AA in the radial direction. When the rotating body 4 rotates relative to the stationary body 2, the first, second, third, and fourth dynamic pressure generating grooves 50, 52, 54, and 56 cause the lubricant 20 to produce dynamic pressure, respectively. Such dynamic pressure supports the rotating body 4 in the radial direction and in the axial direction in a non-contact manner with the stationary body 2.

The shaft encircling member 40 includes, separately from the gap between the sleeve 42 and the upper rod 10 in the radial direction, a communication passage BP of the lubricant 20 that causes the space between the upper flange 12 and the sleeve 42 in the axial direction and the space between the sleeve 42 and the lower flange 16 in the axial direction to be in communication with each other. For example, the communication passage BP includes a passage provided in the sleeve 42 in the axial direction. The communication passage BP may be provided in the cylindrical member 44 instead of the sleeve 42. The communication passage BP reduces a pressure difference between the space between the upper flange 12 and the sleeve 42 in the axial direction and the space between the sleeve 42 and the lower flange 16 in the axial direction. As a result, a possibility that the lubricant 20 leaks out can be reduced.

Figure 5:
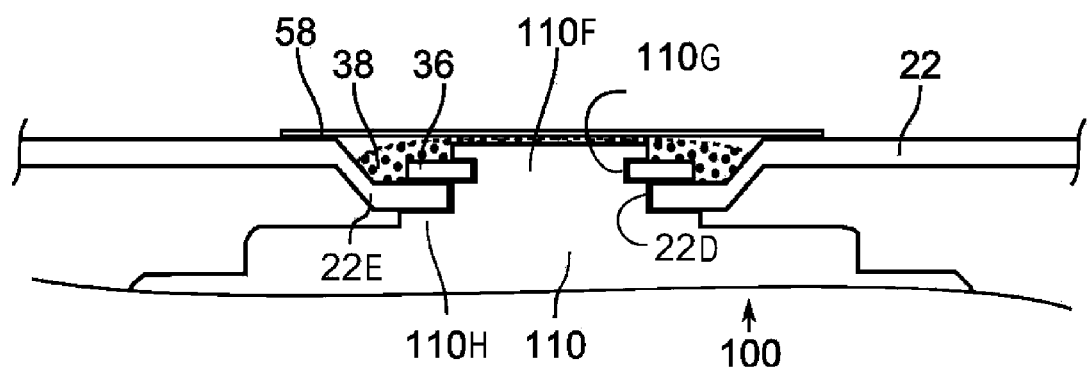
FIG. 5 is an enlarged cross-sectional view illustrating a joined portion between a top cover and an upper shaft member both illustrated in FIG. 2.

An explanation will now be given of a structure in which the top cover 22 is joined with the upper shaft member 110 with reference to FIG. 5. FIG. 5 is an enlarged cross-sectional view illustrating a joined portion between the top cover 22 and the upper shaft member 110 of the rotating device in FIG. 2. FIG. 5 is symmetrical along the rotation axis R, and the reference numeral for the same component at the right or left will be omitted in some cases.

The upper shaft member 110 has the cylindrical convexity 110F fitted in the engagement hole 22D of the top cover 22, and the tip of the cylindrical convexity 110F including the circumferential recess 110G protrudes from the top face of the top cover 22. A fastener 36 with a larger diameter than the engagement hole 22D is fitted to the circumferential recess 110G. For example, a U-shaped or C-shaped snap ring (circlip) as the fastener 36 is fitted to the circumferential recess 110G. The seat 110H and the fastener 36 hold therebetween the circumferential edge of the engagement hole 22D, thereby joining the upper shaft member 110 to the top cover 22. A sealant 38 covers across the circumferential edge of the engagement hole 22D, the fastener 36, and the cylindrical convexity 110F. For example, the sealant 38 is formed by applying a curable resin with an ultraviolet curable characteristic to a predetermined area, and emitting ultraviolet rays of a predetermined integrated light quantity to such a resin. The sealant 38 is formed so as not to protrude from the top face of the top cover 22. The top cover 22 has a cover film 58 applied thereto so as to cover the cylindrical convexity 110F. The sealant 38 or the cover film 58 suppresses a leak-in of unclean ambient air from the exterior of the rotating device 100 to the clean space 70. In particular, when the sealant 38 is attached to the side of the engagement hole 22D and a space between the bottom face of the top cover 22 and the seat 110H of the upper shaft member 110, a leak-in of unclean ambient air can be further suppressed.

Figure 6:
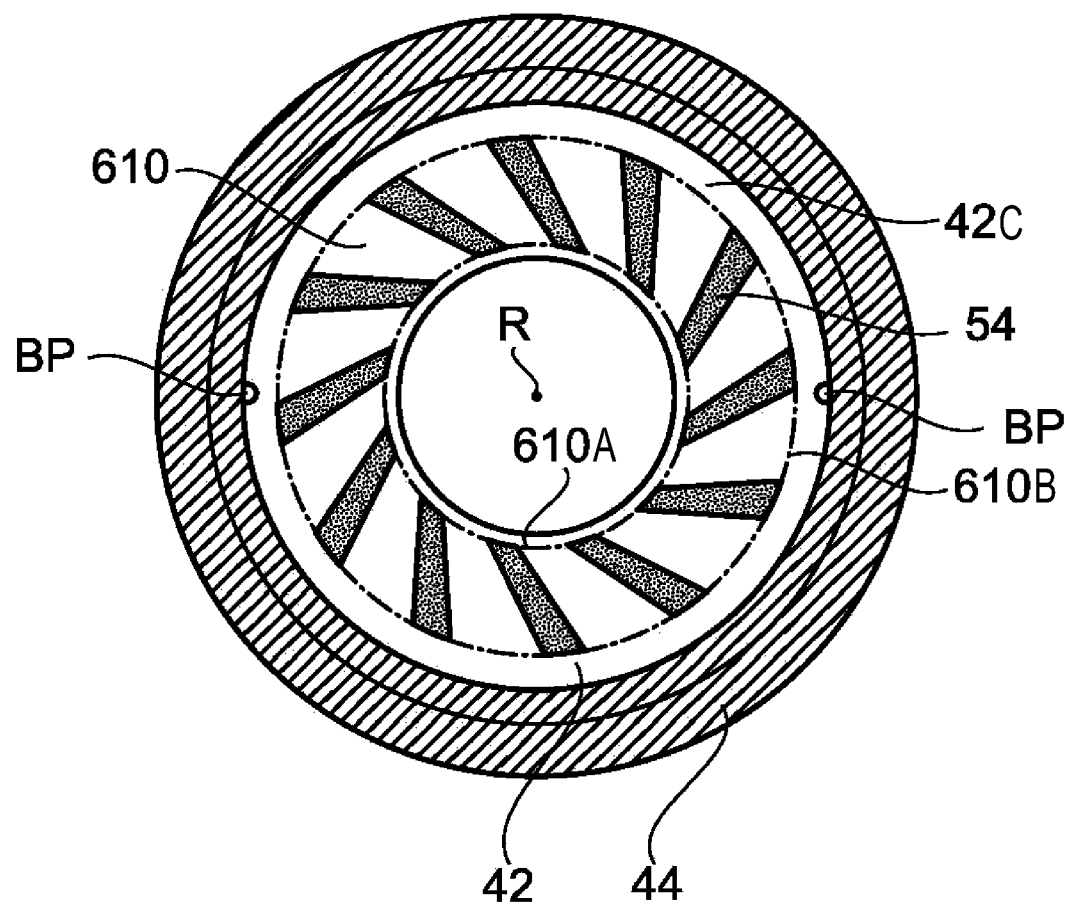
FIG. 6 is a top view illustrating an upper face of a cylindrical member and that of a sleeve both illustrated in FIG. 2.
Figure 7:
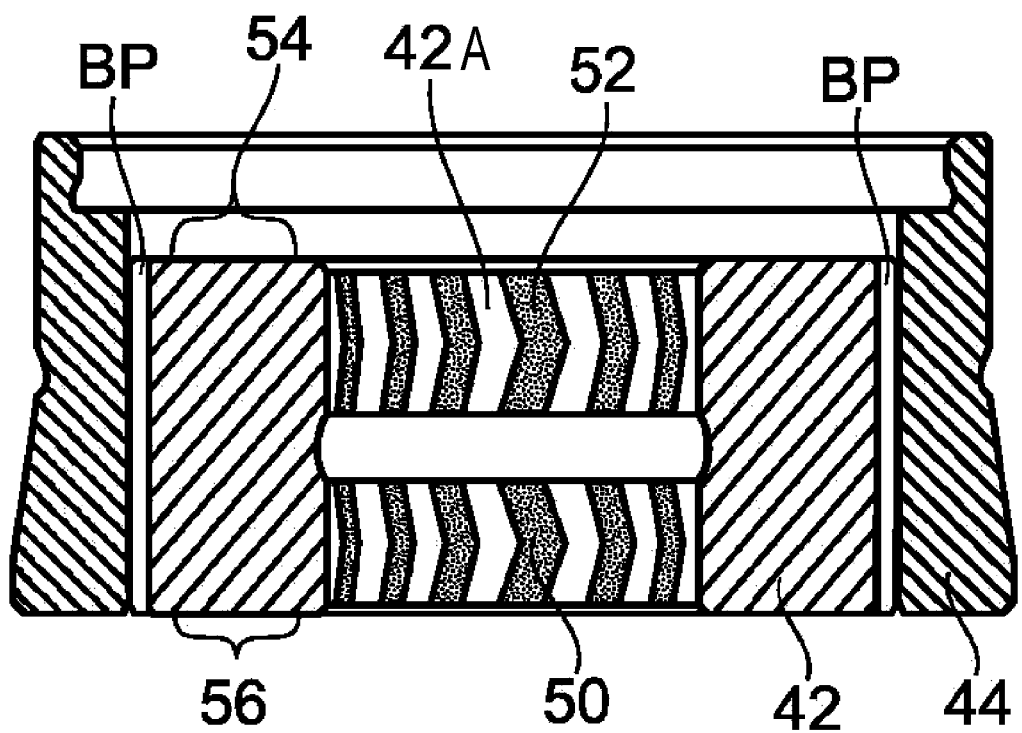
FIG. 7 is an enlarged cross-sectional view illustrating a cross-section of the cylindrical member and that of the sleeve both illustrated in FIG. 2.
Figure 8:
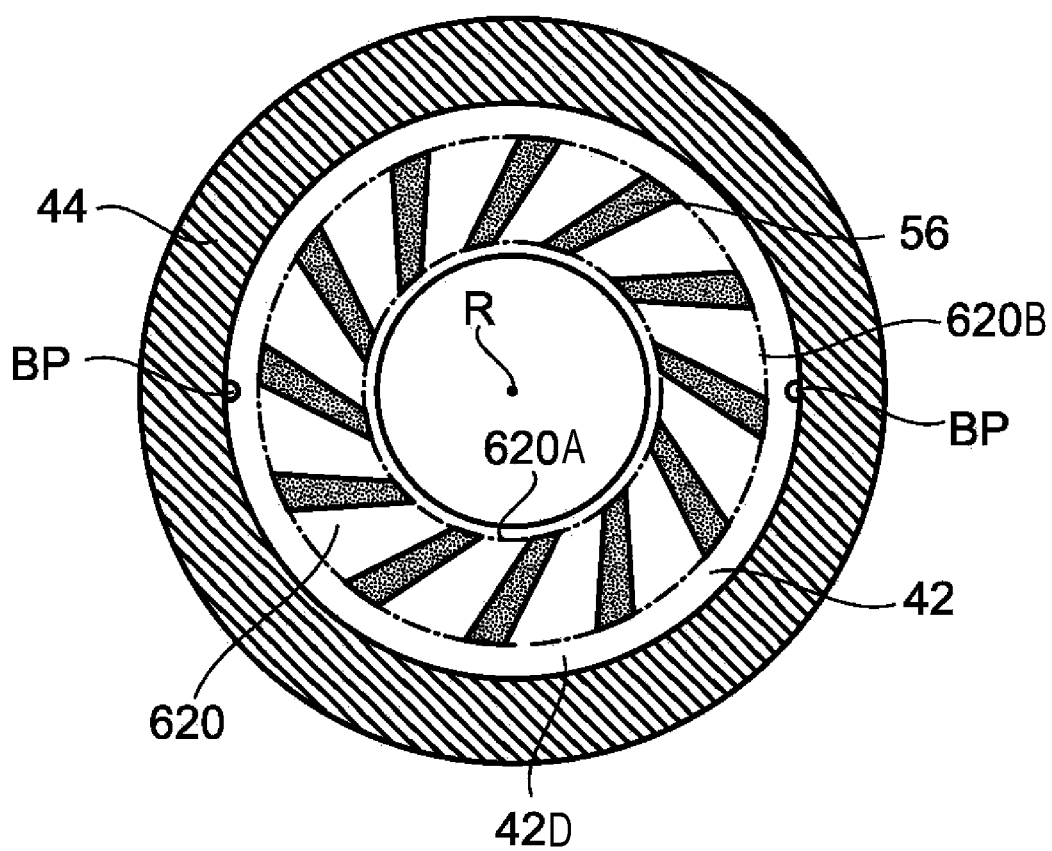
FIG. 8 is a bottom view illustrating a bottom face of the cylindrical member and that of the sleeve both illustrated in FIG. 2.

FIG. 6 is a top view illustrating the top face of the cylindrical member 44 and that of the sleeve 42 both illustrated in FIG. 2. The third dynamic pressure generating groove 54 that produces thrust dynamic pressure is provided in an dispose area 610 of the upper face 42C of the sleeve 42 which is an end face orthogonal to the rotation axis R. The dispose area 610 is formed in a substantially hollow circular shape having an inner circumference 610A and an outer circumference 610B. For example, the third dynamic pressure generating groove 54 has 12 streaks disposed in the dispose area 610 in the circumferential direction at a substantially equal pitch. The third dynamic pressure generating groove 54 runs from the inner circumference 610A of the dispose area 610 toward the outer circumference 610B in the circumferential direction and in the radial direction. FIG. 7 is an enlarged cross-sectional view illustrating the cylindrical member 44 and the sleeve 42 both illustrated in FIG. 2. The first and second dynamic pressure generating grooves 50 and 52 that produce radial dynamic pressure are provided in the inner circumferential surface 42A of the sleeve 42. FIG. 8 is a bottom view illustrating the bottom face of the cylindrical member 44 and that of the sleeve 42 both illustrated in FIG. 2. The fourth dynamic pressure generating groove 56 that produces thrust dynamic pressure is provided in a dispose area 620 of the bottom face 42D of the sleeve 42 that is an end face orthogonal to the rotation axis R. The dispose area 620 is in a substantially hollow circular shape with an inner circumference 620A and an outer circumference 620B. For example, the fourth dynamic pressure generating groove 56 has 12 streaks disposed in the dispose area 620 in the circumferential direction at a substantially equal pitch. The fourth dynamic pressure generating groove 56 runs from the inner circumference 620A of the dispose area 620 toward the outer circumference 620B in the circumferential direction and in the radial direction.

Figure 9:
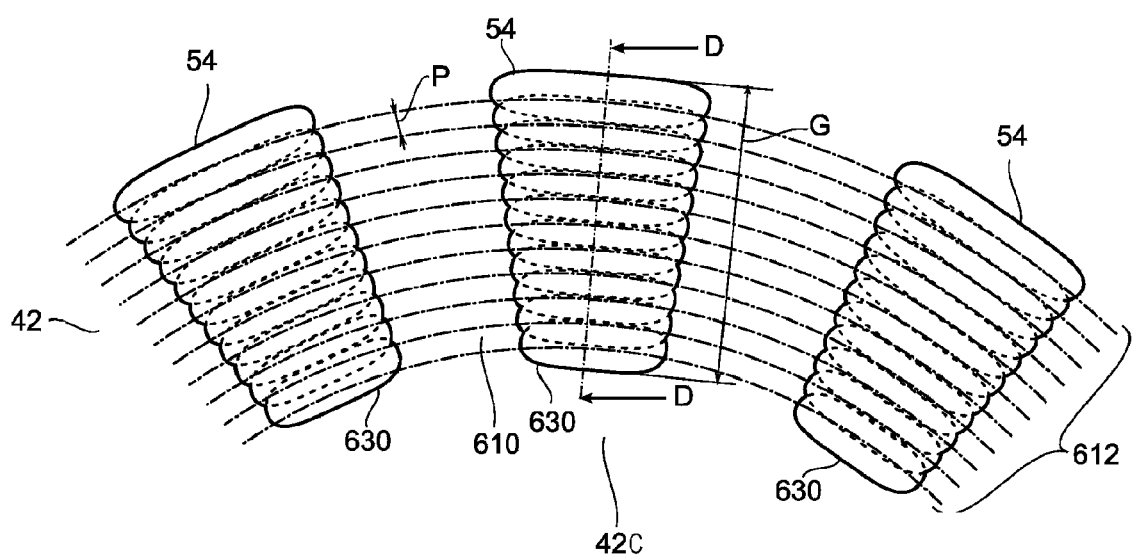
FIG. 9 is a top view exemplifying a dynamic pressure generating groove in FIG. 6 in an enlarged manner.
Figure 10:
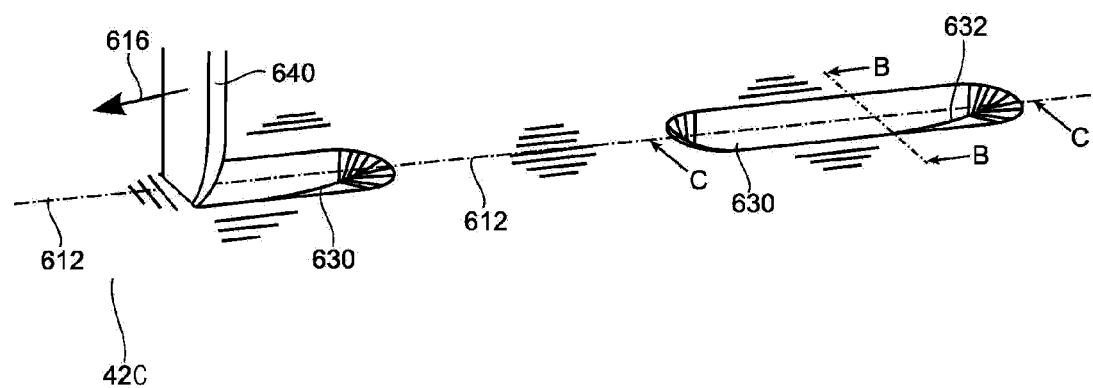
FIG. 10 is a perspective view exemplifying how to process an intermittent recess in FIG. 6.
Figure 11:
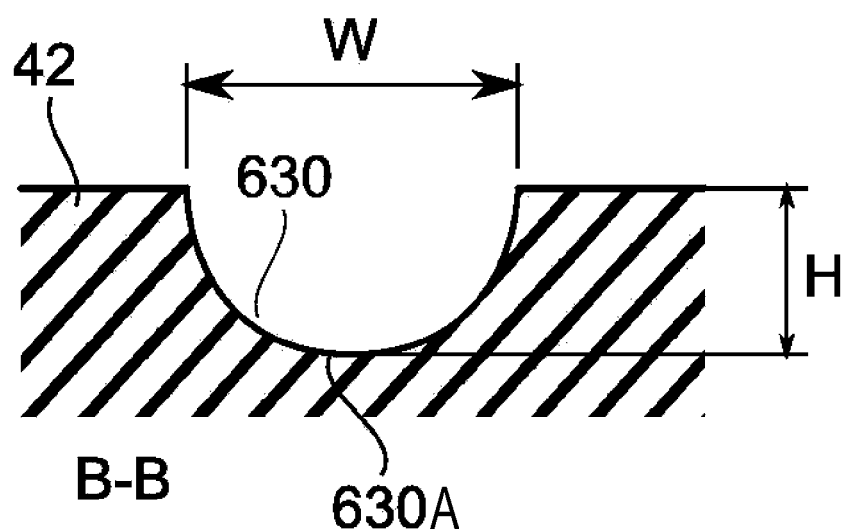
FIG. 11 is a cross-sectional view illustrating a cross-section of the intermittent recess taken along a line B-B in FIG. 10.
Figure 12:
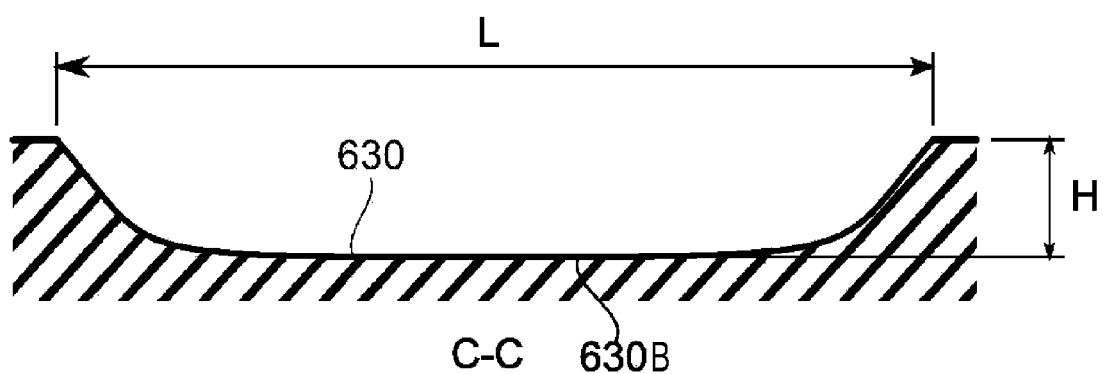
FIG. 12 is a cross-sectional view illustrating a cross-section of the intermittent recess taken along a line C-C in FIG. 10.
Figure 13:
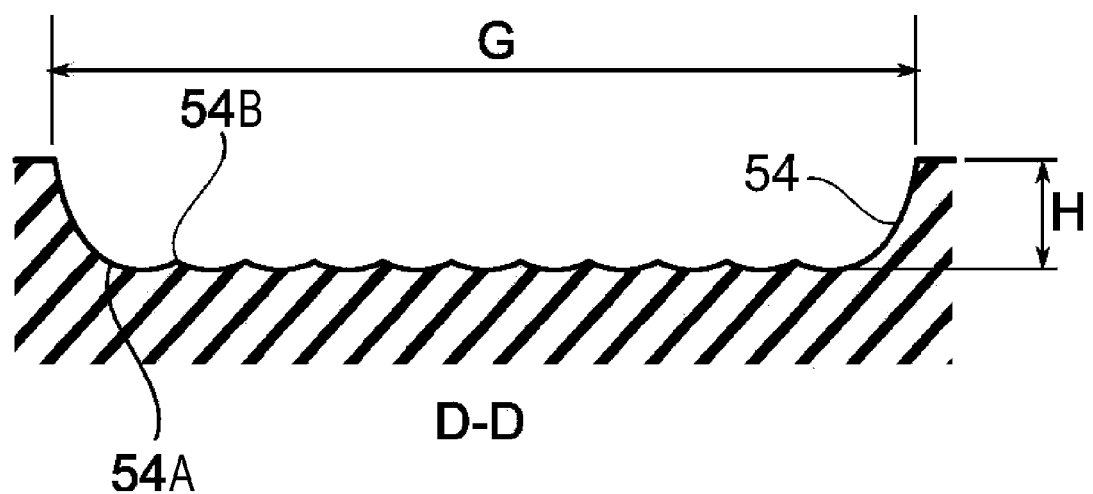
FIG. 13 is a cross-sectional view illustrating a cross-section of the dynamic pressure generating groove taken along a line D-D in FIG. 9.

FIG. 9 is a top view exemplifying the third dynamic pressure generating groove 54 in FIG. 6 in an enlarged manner. Intermittent recesses 630 are disposed successively in a non-continuous manner along a spiral line 612 having a distance from the rotation axis R gradually increasing for each circumference from the inner circumference to the outer circumference. In order to facilitate understanding, in FIG. 9, an adjacent pitch P of the spiral line 612 in the radial direction is illustrated in an emphasized manner, and the inclination of the third dynamic pressure generating groove 54 in the circumferential direction is illustrated in a suppressed manner. The third dynamic pressure generating groove 54 has the intermittent recesses 630 disposed in such a manner so as to partially overlap in the radial direction, thereby being formed as a set of intermittent recesses 630. FIG. 10 is a perspective view exemplifying how to process the intermittent recess 630 in FIG. 6. For example, a machining tool 640 like a cutting bite is relatively moved in the direction of an arrow 616 along the spiral line 612 on the upper face 42C, thereby performing non-continuous cutting and machining. The intermittent recess 630 is formed through such cutting and machining. FIG. 11 illustrates a cross-section 630A of the intermittent recess 630 taken along a line B-B in FIG. 10. FIG. 12 illustrates a cross-section 630B of the intermittent recess 630 taken along a line C-C in FIG. 10. FIG. 13 illustrates a cross-section 54A of the third dynamic pressure generating groove 54 taken along a line D-D in FIG. 9. The cross-section 54A includes protrusions 54B which is present at the boundary of the adjoining intermittent recess 630 in the radial direction and which runs in the circumferential direction. When the rotating body 4 rotates relative to the stationary body 2, the protrusions 54B arrange the direction of the flow of the lubricant 20, thereby suppressing an increase of the rotational resistance.

An explanation will be given of an example shape of the intermittent recess 630 with reference to mainly FIGS. 9 to 12. In the cross-section 630A of the intermittent recess 630, it is preferable if a width W be 0.02 mm to 0.2 mm, and a depth dimension H at the center be 5 μm to 50 μm since this facilitates machining. In the cross-section 630B of the intermittent recess 630, it is preferable if a dimension L in the circumferential direction be 0.3 mm to 2 mm since this facilitates machining. Moreover, it is preferable if the adjoining pitch (pitch of intermittent recess 630 adjoining in radial direction) P of the adjoining portions of the spiral line 612 in the radial direction be 5 μm to 50 μm since this facilitates machining (see FIG. 9). In this embodiment, the intermittent recess 630 has the dimension L in the circumferential direction that is from 0.6 mm to 1.2 mm, the width W that is from 0.05 mm to 0.1 mm, the depth dimension H at the center of the width that is from 10 μm to 20 μm, and the pitch P of the spiral line 612 in the radial direction that is from 7 μm to 14 μm. Moreover, the cross-section 630A of the intermittent recess 630 has a radius that is from 0.03 mm to 0.07 mm. Such setting eliminates variation in machining dimension, or enables a production within a predetermined manufacturing takt time.

When the surface roughness of the bottom of the third dynamic pressure generating groove 54 in the circumferential direction is large, friction with the lubricant 20 increases, and thus rotational resistance at the bearing unit when the rotating body 4 rotates increases. When the rotating body 4 rotates at a predetermined speed with such a rotational resistance, a large drive current becomes necessary. In order to reduce such rotational resistance, the bottom of the intermittent recess 630 has a cut face 632 cut in the circumferential direction using the machining tool 640 like a cutting bite (see FIG. 10). By forming the cut face 632 at the bottom of the intermittent recess 630, the surface roughness measured for the bottom in the circumferential direction can be easily reduced. The machining condition to obtain a desired surface roughness can be defined by, for example, a test with parameters that are the relative speed of the machining tool 640 and that of the sleeve 42. In this embodiment, the surface roughness measured in the circumferential direction for the bottom of the third dynamic pressure generating groove 54 is set to be equal to or smaller than 0.5 μm, and is smaller than the surface roughness measured in the radial direction which is 1 μm.

When the side face of the cross-section 630A of the intermittent recess 630 which is a cross-section along a straight line passing through the rotation axis R has unevenness like concavities and convexities, a turbulence of the lubricant 20 is caused in accordance with the concavities and convexities when the rotating body 4 rotates, and thus the rotational resistance is highly possibly increased (see FIG. 11). In this embodiment, the cross-section 630A of the intermittent recess 630 is formed as a smooth curve that gradually decreases the width of the radial direction inwardly of the axial direction, i.e., toward the deeper part in the depthwise direction. It is preferable since such a curve is not likely to produce a turbulence of the lubricant 20. The side face shape of the third dynamic pressure generating groove 54 can be defined by, for example, a test with a parameter that is the tip shape of the machining tool 640.

When the number of turns of the spiral line 612 is small, a length dimension G of the third dynamic pressure generating groove 54 in the radial direction becomes short. Accordingly, thrust dynamic pressure to be generated becomes small, and thus a sufficient bearing rigidity cannot be ensured in some cases (see FIG. 9). In order to address this disadvantage, the intermittent recesses 630 are formed so as to be successive along the spiral line 612 that turns equal to or greater than 10 turns from the inner circumference 610A of the dispose area 610 to the outer circumference 610B thereof. The number of turns of the spiral line 612 can be substantially defined by a quotient obtained by dividing the length dimension G of the third dynamic pressure generating groove 54 in the radial direction by the pitch P of the adjoining intermittent recesses 630 in the radial direction (see FIG. 9). When, for example, the length dimension G of the third dynamic pressure generating groove 54 in the radial direction is 5 mm, and the pitch P of the adjoining intermittent recess 630 is 20 μn, the number of turns of the spiral line 612 is 250 turns. If the number of turns of the spiral line 612 is too large, the machining time for the third dynamic pressure generating groove 54 becomes long. It is confirmed that when the number of turns of the spiral line 612 is equal to or smaller than 2000 turns, such machining time does not become a practical problem.

The inventor of the present invention reaches following findings through a keen study.

(1) When the rotating body 4 rotates relative to the stationary body 2, the third dynamic pressure generating groove 54 gathers the lubricant 20 toward a predetermined area (hereinafter, referred to as a compression area), thereby generating dynamic pressure at the compression area.

(2) The generated dynamic pressure can be increased by increasing the amount of gathered lubricant 20. Moreover, the generated dynamic pressure can be increased by narrowing down the compression area. That is, when the larger amount of lubricant 20 is gathered at the narrower compression area, the dynamic pressure generated at the compression area can be increased.

Based on the above findings, the third dynamic pressure generating groove 54 has a width dimension in the circumferential dimension becoming small from the outer circumference 610B of the dispose area 610 toward the inner circumference 610A thereof where the compression area is provided (see FIG. 6). When the compression area is provided at the outer-circumference-610B side, the third dynamic pressure generating groove 54 may have the width dimension in the circumferential direction becoming small from the inner circumference 610A of the dispose area 610 toward the outer circumference 610B where the compression area is provided. When the compression area is provided in the middle portion between the inner circumference 610A and the outer circumference 610B, the third dynamic pressure generating groove 54 may have a width dimension in the circumferential direction becoming small from the outer circumference 610B of the dispose area 610 and from the inner circumference 610A toward the middle portion where the compression area is provided.

Figure 16:
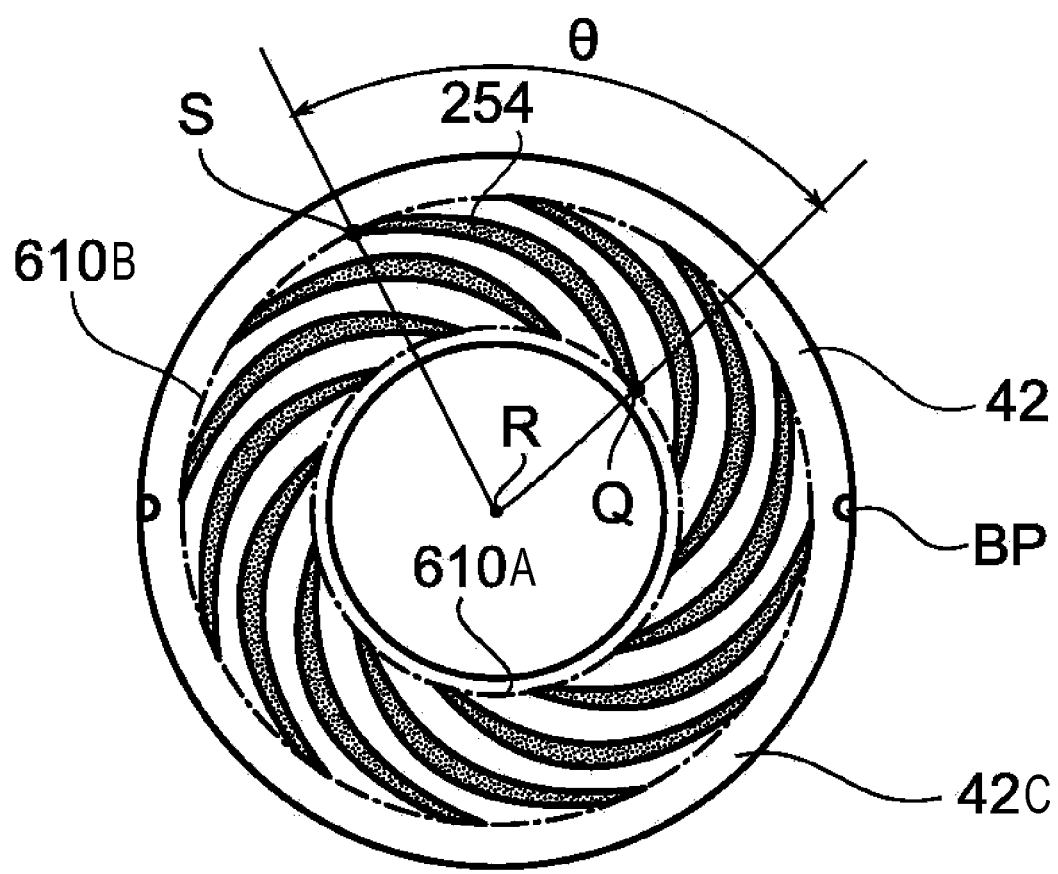
FIG. 16 is a top view illustrating an upper face of the sleeve having a dynamic pressure generating groove in another example shape according to the embodiment of the present invention.

Next, an explanation will be given of a vertex angle A of a sector outwardly contacting the third dynamic pressure generating groove of a streak and having the rotation axis R as a vertex. When this vertex angle 8 is small, the rotational resistance at a dynamic pressure generating groove portion increases, and thus the efficiency of gathering the lubricant may decrease. It is confirmed through a computer simulation that when the vertex angle 8 is at least within a range from 60 degrees to 120 degrees, the rotation resistance at the third dynamic pressure generating groove is reduced, and the lubricant 20 can be efficiently gathered. FIG. 16 is a top view illustrating the upper face 42C of the sleeve 42 having a dynamic pressure generating groove 254 with another example shape according to the embodiment of the present invention. When a point contacting the inner circumference 610A of the third dynamic pressure generating groove 254 is Q, and a point contacting the outer circumference 610B is S, the vertex angle θ (=∠QRS) of the sector having the rotation axis R as a vertex is set to be 80 degrees±10 degrees. Moreover, such a sector is disposed in such a manner as to traverse two or three streaks of the third dynamic pressure generating groove 254 in the radial direction from the inner circumference 610A of the dispose area 610 toward the outer circumference 610B thereof. According to such a structure, a variation in the above-explained effect can be canceled and dynamic pressure can be efficiently generated.

Figure 17:
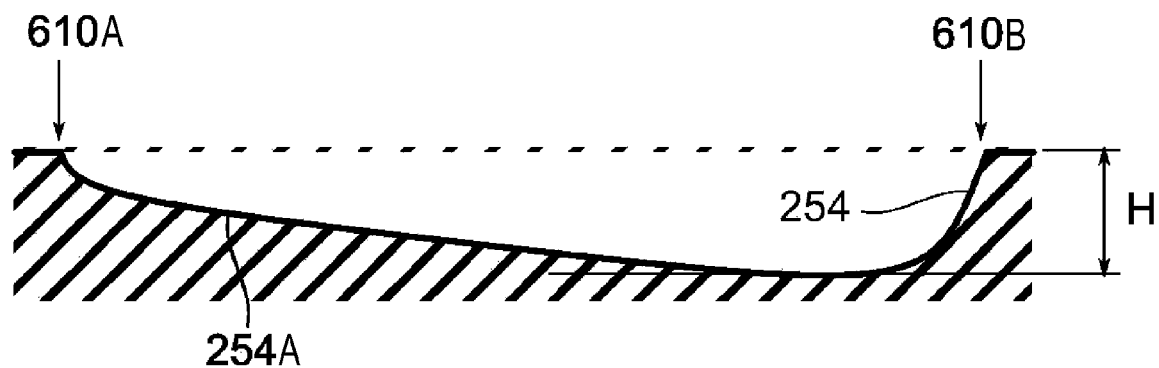
FIG. 17 is a cross-sectional view illustrating a cross-section of the sleeve in FIG. 16 along the center of the circumferential direction of the dynamic pressure generating groove.

FIG. 17 is a cross-sectional view illustrating a cross-section of the third dynamic pressure generating groove 254 in FIG. 16 along the center of the circumferential direction. The third dynamic pressure generating groove 254 has a larger depth dimension in the axial direction at the outer-circumference-610B side of the dispose area 610, and has a smaller depth dimension in the axial direction toward the inner-circumference-610A side where the compression area is provided. According to this structure, a larger amount of lubricant 20 is gathered at the outer-circumference-610B side, the compression area at the inner-circumference-610A side is narrowed down, thereby increasing dynamic pressure in the thrust direction to be generated at such an area. The increase of the dynamic pressure in the thrust direction increases the bearing rigidity or suppresses a reduction of the bearing rigidity when the rotating device is downsized.

When the compression area is provided at the outer circumference side, the third dynamic pressure generating groove may have a larger depth dimension in the axial direction at the inner circumference side of the dispose area, and have a smaller depth dimension in the axial direction toward the outer circumference. Moreover, when the compression area is provided at the middle portion between the inner circumference and the outer circumference, the third dynamic pressure generating groove may have a larger depth dimension in the axial direction at the inner circumference side of the dispose area and at the outer circumference thereof and have a smaller depth dimension in the axial direction toward the middle portion where the compression area is provided.

The third dynamic pressure generating groove 54 has a boundary with a non-concaved portion where the intermittent recess 630 is not formed in a wavy shape from the inner circumference 610A of the dispose area 610 toward the outer circumference 610B thereof (see FIG. 9).

Figure 18:
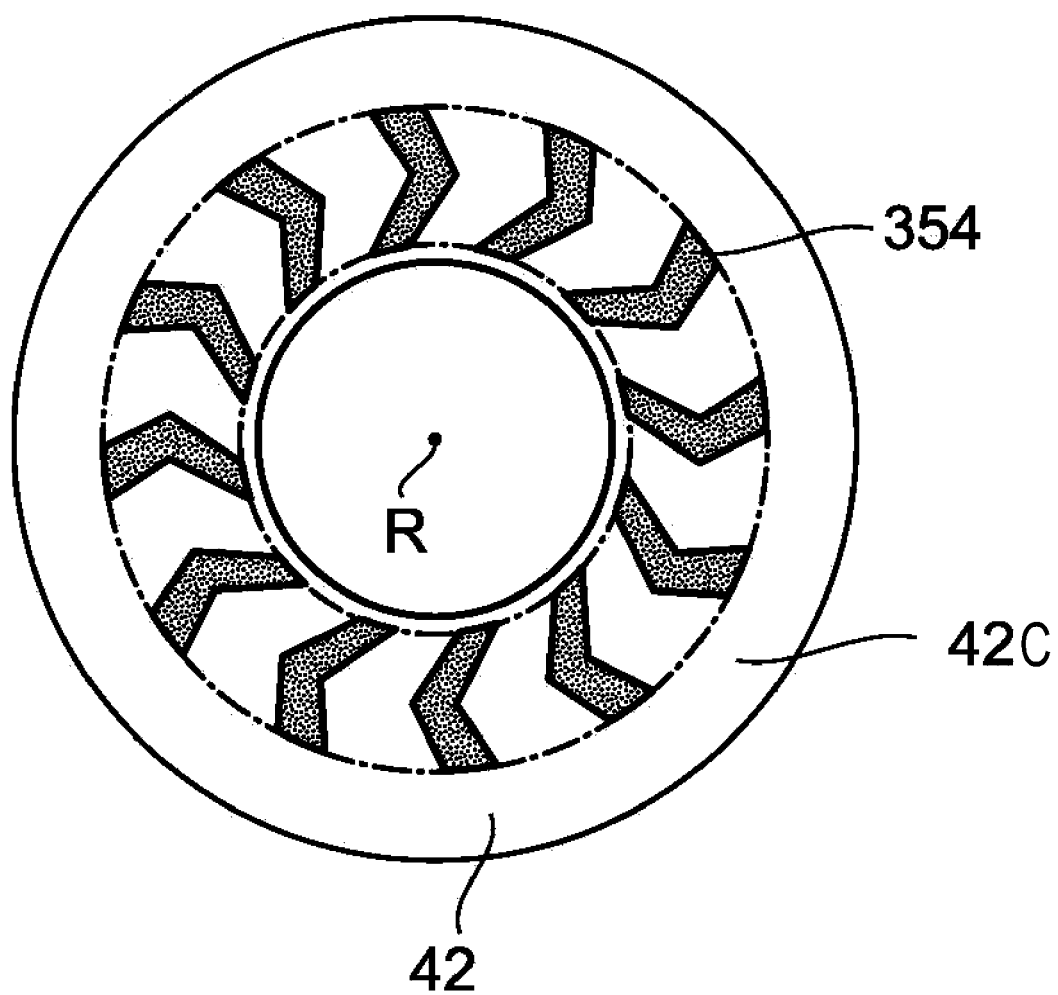
FIG. 18 is a top view illustrating an upper face of the sleeve having a dynamic pressure generating groove in a herringbone shape according to the embodiment of the present invention.

The above explanation was given of a case in which the third dynamic pressure generating groove 54 is in a spiral shape, but the present invention is not limited to this case. For example, the third dynamic pressure generating groove 54 may be in a herringbone shape, and the same action and advantage can be accomplished. FIG. 18 is a top view illustrating the upper face 42C of the sleeve 42 having a dynamic pressure generating groove 354 in a herringbone shape according to an embodiment of the present invention.

The explanation was mainly given of the structure of the third dynamic pressure generating groove 54, but the fourth dynamic pressure generating groove 56 also employs the same structure as that of the third dynamic pressure generating groove 54.

<Manufacturing Method>

A manufacturing method according to an embodiment of the present invention is a method of manufacturing a rotating device. The rotating device is, for example, a disk drive device, in particular, a hard disk drive on which a magnetic recording disk is loaded. The following explanation will be given of an example case in which the above-explained rotating device 100 is manufactured.

Figure 14:
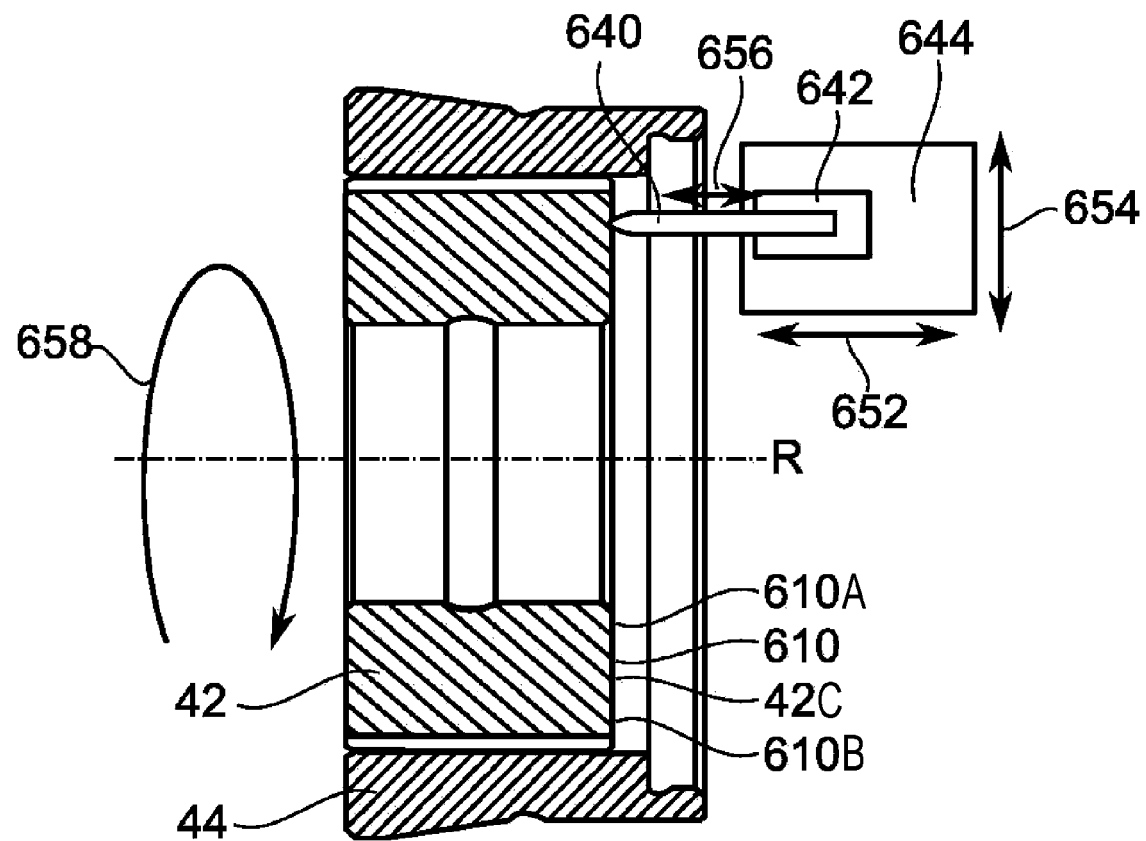
FIG. 14 is an exemplary diagram for explaining a manufacturing method of a rotating device according to an embodiment of the present invention.

FIG. 14 is an exemplary diagram for explaining a manufacturing method according to an embodiment of the present invention. FIG. 14 illustrates a process of forming the third dynamic pressure generating groove 54 that generates thrust dynamic pressure in the dispose area 610 of the upper face 42C of the sleeve 42 retained in and joined with the cylindrical member 44 in FIG. 2. The third dynamic pressure generating groove 54 is formed as a set of the intermittent recesses 630 in the substantially hollow circular dispose area 610. More specifically, the sleeve 42 joined with the cylindrical member 44 has the outer circumferential surface 44B of the cylindrical member 44 held by an unillustrated clamping mechanism, and is clamped on the spindle of a processing machine. Next, the spindle of the processing machine is rotated to rotate the sleeve 42 joined with the cylindrical member 44 in the direction of an arrow 658 around the rotation axis R of the rotating body. Subsequently, the machining tool 640 is moved close to the upper face 42C of the rotating sleeve 42 in the direction of an arrow 652 along the rotation axis R. The machining tool 640 is caused to perform reciprocal motion that repeats a contacting condition and a noncontacting condition with the upper face 42C by moving the machining tool 640 in the direction of an arrow 656 along the rotation axis R. The machining tool 640 is moved in the direction of an arrow 654 from the inner circumference 610A of the dispose area 610 toward the outer circumference 610B. The machining tool 640 may be moved in the direction of an arrow 654 from the outer circumference 610B of the dispose area 610 toward the inner circumference 610A.

In an example method illustrated in FIG. 14 according to the embodiment of the present invention, the machining tool 640 is joined with a piezoelectric element 642. The piezoelectric element 642 is driven by an unillustrated drive circuit, and generates reciprocal drive force. The reciprocal drive force by the piezoelectric element 642 causes the machining tool 640 to perform reciprocal motion along the direction of an arrow 656. When a time axis is taken as a horizontal axis and a position of the tip of the machining tool 640 in the axial direction is taken as a vertical axis, the machining tool 640 performs reciprocal motion in, for example, a substantially sinusoidal waveform. The machining tool 640 and the piezoelectric element 642 are coupled on a movable stage 644. The movable stage 644 moves in the direction of an arrow 654 by an unillustrated drive unit.

Figure 15:
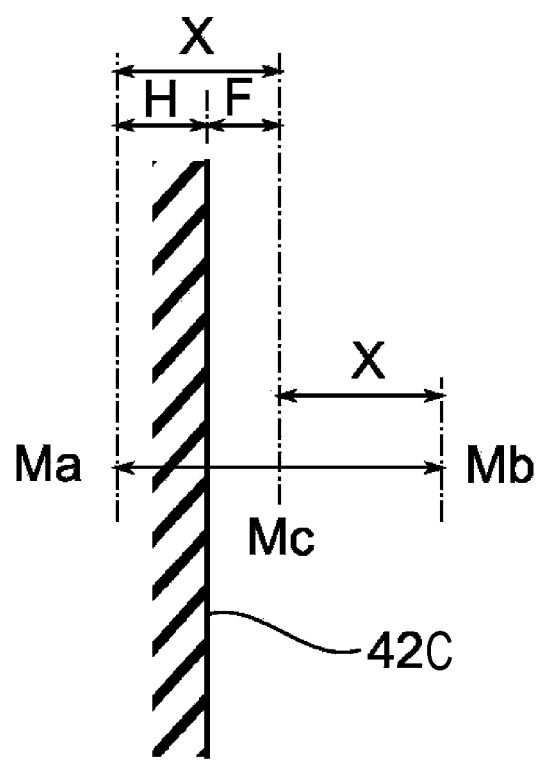
FIG. 15 is an exemplary diagram illustrating a range of reciprocation motion of a machining tool in the manufacturing method illustrated in FIG. 14.

FIG. 15 is an exemplary diagram for explaining a relationship between the position of the upper face 42C and the range of the reciprocal motion of the machining tool 640 in the process of forming the third dynamic pressure generating groove 54 in FIG. 14. In FIG. 15, Mc is a position of the tip of the machining tool 640 in an undriven condition. The machining tool 640 has the tip position reciprocate within a range from Ma to Mb. In the method according to this embodiment, the tip position Mc of the machining tool 640 in an undriven condition is located at the center of the reciprocal motion range that is between Ma and Mb. When it is attempted to set the tip position Mc of the machining tool 640 in an undriven condition to be inwardly of the upper face 42C in the axial direction, a setting work needs a time. Hence, according to this embodiment, the tip position Mc of the machining tool 640 in an undriven condition is set to be located outwardly of the upper face 42C in the axial direction by a distance F. When, for example, it is attempted to obtain a desired groove depth H, the distance F to be set can be easily obtained as a difference between a width X from Ma to Mc and the groove depth H. That is, the groove depth H is set to be smaller than the width X.

The timing of the reciprocal motion is controlled in synchronization with the timing of the rotation of the sleeve 42. More specifically, when a repeat cycle of the reciprocal motion is Fa, a number of rotations of the sleeve 42 is Fs, and the number of streaks of the third dynamic pressure generating groove 54 is N, it is controlled so as to satisfy a relationship Fa=N·Fs. According to the method of this embodiment, for example, the number of rotations Fs of the sleeve 42 is set to be 25 Hz (1500 min$^{-1}$), and the repeat cycle of the reciprocal motion is set to be 300 Hz, and the third dynamic pressure generating groove 54 having a number of streaks that is 12 is formed. When the number of rotations Fs of the sleeve 42 or the repeat cycle Fa of the reciprocal motion is too high, the respective shapes of the intermittent recesses 630 become nonuniform, which may negatively affect the bearing action. Conversely, when Fs or Fa is too low, the labor time becomes long. It is preferable that the number of rotations Fs should be set within a range from 5 Hz to 100 Hz, and the repeat cycle Fa of the reciprocal motion should be within a range from 100 Hz to 2000 Hz. It is confirmed that there is no practical problem in the shapes of the intermittent recesses 630 and the labor time at least within this range.

When the upper face 42C of the sleeve 42 is inclined against the rotation axis R, an offset in the circumferential direction is caused in the gap with the lower face 12C of the upper flange 12 in the thrust direction. When this gap is offset, dynamic pressure to be produced in the thrust direction is also offset in the circumferential direction, which may negatively affects the rotation of the rotating body 4. The method according to this embodiment includes a pre-machining process of letting the squareness of the upper face 42C of the sleeve 42 relative to the rotation axis R to be small. The process of forming the third dynamic pressure generating groove 54 is executed continuously from the pre-machining process. In the pre-machining process, the sleeve 42 joined with the cylindrical member 42 in the process illustrated in FIG. 14 is rotated in the direction of the arrow 658 around the rotation axis R of the rotating body, and the upper face 42C of the sleeve 42 is cut and machined using the machining tool 640. The machining tool 640 is moved in the direction of the arrow 652 along the rotation axis R, and is moved in the direction of the arrow 654 from the inner circumference of a pre-machining area in a substantially annular shape including the dispose area 610 and larger than the dispose area 610 toward the outer circumference thereof while contacting the upper face 42C to cut and machine the pre-machining area. At this time, the machining tool 640 is not subjected to a reciprocal motion. The machining tool 640 may be moved in the direction of the arrow 654 from the outer circumference of the pre-machining area toward the inner circumference thereof. The machining allowance is set to be larger than the depth dimension of the intermittent recess 630 in the axial direction but is set to be equal to or smaller than 200 μm. Such a setting reduces the manufacturing error, and suppresses an increase of the labor time. The machining allowance of the pre-machining process is set to be within a range from 20 μm to 60 μm in this embodiment. Such a setting eliminates a variation in the dimension at the time of machining or enables a manufacturing within a predetermined manufacturing takt time. The process of forming the third dynamic pressure generating groove 54 is successively executed while the clamped condition of the cylindrical member 44 joined with the sleeve 42 to the processing machine in the pre-machining process is maintained and without releasing such a clamped condition. Accordingly, a labor time associated with clamping can be reduced.

When the third dynamic pressure generating groove 54 is machined by the machining tool 640, a flush or a burr may be present at a boundary between the intermittent recess 630 and the non-concaved portion through such machining. When such flush or burr is peeled from the sleeve 42, it may become a foreign material, enters in a narrow space in the rotating device 100, and may cause a performance deterioration or a breakdown. The method according to this embodiment includes a post-machining process that reduces the unevenness of the surface of the non-concaved portion of the third dynamic pressure generating groove 54, and the process of forming the third dynamic pressure generating groove 54 and the post-machining process are successively executed. This can reduce the flush or burr of the non-concaved portion, thereby reducing the possibility of a breakdown. In the post-machining process, the sleeve 42 joined with the cylindrical member 44 in the process illustrated in FIG. 14 is rotated in the direction of the arrow 658 around the rotation axis R of the rotating body, and the upper face 42C of the sleeve 42 is cut and machined using the machining tool 640. The machining tool 640 is moved in the direction of the arrow 652 along the rotation axis R, and is moved in the direction of the arrow 654 from the inner circumference of a post-machining area in a substantially annular shape including the dispose area 610 and larger than the dispose area 610 toward the outer circumference thereof while being contacting the upper face 42C to cut and machine the post-machining area. At this time, the machining tool 640 is not subjected to a reciprocal motion. The machining tool 640 may be moved in the direction of the arrow 654 from the outer circumference of the post-machining area toward the inner circumference thereof. The machining allowance of the post-machining process in this embodiment is set to be within a range from 2 μm to 8 μm. This machining allowance is set to be smaller than the depth dimension of the intermittent recess 630 in the axial direction. Such a setting eliminates a variation in the dimension at the time of machining or enables a manufacturing within a predetermined manufacturing takt time. The post-machining process is successively executed while the clamped condition of the cylindrical member 44 joined with the sleeve 42 to the processing machine in the process of forming the third dynamic pressure generating groove 54 is maintained and without releasing such a clamped condition. Accordingly, a labor time associated with clamping can be reduced.

The process of forming the third dynamic pressure generating groove 54 was mainly explained above, but the fourth dynamic pressure generating groove 56 is also formed through the same processes as those of the third dynamic pressure generating groove 54.

Next, with reference to FIGS. 2, 4 and 5, an explanation will be given of an example method of manufacturing the rotating device 100.

(1) The outer circumferential surface 42B of the sleeve 42 is, for example, fitted in and fastened to the inner circumferential surface 44A of the cylindrical member 44. Bonding or press-fit bonding may be applied instead of press-fitting (see FIG. 4).

(2) The first and second dynamic pressure generating grooves 50 and 52 are provided in the inner circumferential surface 42A of the sleeve 42 (see FIG. 4).

(3) The third dynamic pressure generating groove 54 is provided in the upper face 42C of the sleeve 42. The fourth dynamic pressure generating groove 56 is provided in the lower face 42D of the sleeve 42 (see FIG. 4).

(4) The upper shaft member 110 having the upper rod 10 and the upper flange 12 already joined together is fitted in the inner circumferential surface 42A of the sleeve 42, and retained therein (see FIG. 4).

(5) The lower shaft member 112 having the lower flange 16, the flange encircling member 18 and the lower rod 14 already joined together has the lower rod 14 fitted in the retainer hole 10A of the upper rod 10, and joined therewith. The lower rod 14 is joined with the retainer hole 10A of the upper rod 10 by a combination of press-fitting and bonding.

For example, the lower rod 14 is fitted in and fastened to the retainer hole 10A at an area near the lower flange 16, and is bonded and fastened to the retainer hole 10A at an area near the upper flange 12. That is, the bonding area of the lower rod 14 and the retainer hole 10A is located above the press-fit area of those lower rod 14 and retainer hole 10A.

Upon joining the upper rod 10 with the lower rod 14, the sleeve 42 is present in a space where the upper flange 12 and the lower flange 16 face with each other in the axial direction (see FIG. 4).

(6) The ring member 46 is, for example, press-fitted in and fastened to the cylindrical member 44. Bonding or press-fit bonding may be applied instead of press-fitting (see FIG. 4).

(7) The lubricant 20 is filled in the predetermined space between the rotating body 4 and the stationary body 2. The fluid dynamic bearing unit is thus produced (see FIG. 4).

(8) The magnet 28 is fastened to the inner circumferential surface 26H of the second annular part 26E of the hub 26 (see FIG. 2).

(9) The outer circumferential surface 44B of the cylindrical member 44 is fastened to the inner circumferential surface 26B of the first annular part 26A of the hub 26 by, for example, press-fitting. Bonding or press-fit bonding may be applied instead of press-fitting (see FIG. 4).

(10) The cap 48 is fastened to the recess 26I of the first annular part 26A by, for example, press-fitting. Bonding or press-fit bonding may be applied instead of press-fitting (see FIG. 4).

(11) The stator core 32 having the coils 30 wound therearound is fastened to the base 24 by, for example, press-fitting. Bonding or Press-fit bonding may be applied instead of press-fitting (see FIG. 2).

(12) The flange encircling member 18 is fitted in the opening 24D of the base 24, and is bonded and fastened thereto (see FIG. 4).

(13) The magnetic recording disk 62 is mounted on the hub 26 (see FIG. 2).

(14) The reader/writer 60 and other components are attached to the base 24.

(15) The cylindrical convexity 110F is fitted in the engagement hole 22D of the top cover 22, and the fastener 36 is attached. The sealant 38 is applied across the circumferential edge of the engagement hole 22D, the fastener 36, and the cylindrical convexity 110F, and the cover film 58 is further applied thereabove (see FIG. 5).

(16) The top cover 22 is joined with the base 24. The rotating device 100 is completely manufactured through other processes like a predetermined inspection.

The above-explained manufacturing method of the rotating device 100 and the procedures thereof are merely examples, and the rotating device 100 can be manufactured by other methods and procedures.

An explanation will now be given of an operation of the rotating device 100 employing the above-explained structure. Three-phase drive currents are supplied to the coils 30 in order to rotate the magnetic recording disk 62. The drive currents flowing through the coils 30 produce field magnetic fluxes along the salient poles of the stator core 32. Torque is applied to the magnet 28 by the mutual action of the field magnetic fluxes and the magnetic fluxes of the drive magnetic poles of the magnet 28, and thus the hub 26 and the magnetic recording disk 62 engaged therewith are rotated. At the same time, the voice coil motor 66 causes the swing arm 64 to swing, thereby causing the recording/playing head to move back and forth within the swingable range over the magnetic recording disk 62. The recording/playing head converts magnetic data recorded in the magnetic recording disk 62 into electric signals, and transmits such electric signals to an unillustrated control substrate, or writes data transmitted from the control circuit in the form of electric signals into the magnetic recording disk 62 as magnetic data.

The rotating device 100 according to this embodiment and employing the above-explained structure has following features. The rotating device 100 has a dynamic pressure generating groove formed as a set of intermittent recesses. This enables production of a dynamic pressure generating groove having a groove width and a groove depth changed and a refined dynamic pressure generating groove which are difficult in the cases of conventional manufacturing technologies. Alternatively, the labor work for processing such a shape of the dynamic pressure generating groove can be reduced, thereby suppressing a reduction of the work efficiency. As a result, the dynamic pressure generating groove can be structured so as to efficiently generate dynamic pressure, and compensates the bearing rigidity. This enables a rotating device suitable for downsizing to be provided.

According to the manufacturing method of the rotating device of the embodiment, the dynamic pressure generating groove is formed by cutting and machining, pressure loading applied to the sleeve in the axial direction can be suppressed, thereby preventing the inner circumference surface of the sleeve from being deformed and expanded due to the pressure loading. This results in a reduction of a possibility that the shaft and sleeve contact with each other, thereby suppressing a deterioration of the performance, a generation of contact sounds, and an occurrence of a worn-out of a contacting portion, etc. Moreover, the shape of the dynamic pressure generating groove to be formed can be easily changed by changing a machining program. As a result, the dynamic pressure generating groove that can efficiently generate dynamic pressure can be formed, and thus a manufacturing method of a rotating device which facilitates downsizing can be provided.

The explanation was given of the structure of the rotating device according to the embodiment, and the operation thereof. The embodiment is merely an example, and it should be understood for those skilled in the art that the combination of the respective components permits various modifications, and such modifications are within the scope and spirit of the present invention.

In the above-explained embodiment, the explanation was given of the example case in which the lower shaft member is directly attached to the base, but the present invention is not limited to this case. For example, a brushless motor including a rotating body and a stationary body may be formed separately, and such a brushless motor may be attached to a chassis.

In the above-explained embodiment, the explanation was given of the example case (a so-called outer rotor structure) in which the stator core is encircled by the magnet, but the present invention is not limited to this case. For example, a structure (a so-called inner rotor structure) in which the magnet is encircled by the stator core may be employed.

In the above-explained embodiment, although a part of the cylindrical convexity of the upper shaft member protrudes from the top face of the top cover, the present invention is not limited to this case. For example, a structure may be employed in which the upper end face of the cylindrical convexity is bonded with and fastened to the bottom face of the top cover.

In the above-explained embodiment, the explanation was given of the example case in which the third and fourth dynamic pressure generating grooves 54 and 56 which generate dynamic pressure in the thrust direction are each formed as a set of intermittent recesses. However, the first and second dynamic pressure generating grooves 50 and 52 which generate dynamic pressure in the radial direction may be each formed as a set of intermittent recesses. In this case, such recesses may be formed through cutting and machining as explained above.

What is claimed is:

1. A component for a fluid bearing, the component comprising:
   a cylindrical member comprising a thrust dynamic pressure generating groove which is provided in one end face of the cylindrical member and which generates thrust dynamic pressure;
   wherein:
   the thrust dynamic pressure generating groove comprises a plurality of recesses;
   the plurality of recesses are formed individually by cutting and machining the one end face of the cylindrical member by a machining tool;
   the plurality of individual recesses are disposed on, within a region where the thrust dynamic pressure generating groove is provided, a spiral basal line which turns multiple times in the region where the thrust dynamic pressure generating groove is provided and which has a distance from a center of the cylindrical member gradually increasing for each turn on the one end face of the cylindrical member, the plurality of individual recesses each being disposed on the spiral basal line turn by turn; and
   each of the plurality of individual recesses partially overlaps an adjoining recess from an inner circumference of the region where the thrust dynamic pressure generating groove is provided to an outer circumference thereof.

2. The component according to claim 1, wherein the cylindrical member further comprises a radial dynamic pressure generating groove which is provided in an inner circumferential surface of the cylindrical member and which generates radial dynamic pressure, and the radial dynamic pressure generating groove is formed as a set of intermittent recesses.

3. The component according to claim 1,
   wherein the individual recesses are disposed from the inner circumference of the region where the thrust dynamic pressure generating groove is disposed toward the outer circumference thereof by equal to or greater than 10 turns and equal to or less than 2000 turns.

4. The component according to claim 1, further comprising a protrusion which is formed on a bottom of the thrust dynamic pressure generating groove and which runs in a circumferential direction.

5. The component according to claim 1, wherein:
   a second thrust dynamic pressure generating groove is provided in a second end face opposite to the one end face in an axial direction, and
   the second thrust dynamic pressure generating groove comprises a cut-and-machined face.

6. The component according to claim 1, wherein a bottom of the thrust dynamic pressure generating groove has a surface roughness which is measured in a circumferential direction and which is smaller than a surface roughness of the bottom of the thrust dynamic pressure generating groove measured in a radial direction.

7. The component according to claim 1, wherein the thrust dynamic pressure generating groove has a depth dimension in an axial direction which reduces from a side of one of the inner circumference and the outer circumference of the region where the thrust dynamic pressure generating groove is provided toward a side of the other of the inner circumference and the outer circumference of the region where the thrust dynamic pressure generating groove is provided.

8. The component according to claim 1, wherein the thrust dynamic pressure generating groove has a width dimension in a circumferential direction which reduces from a side of one of the inner circumference and the outer circumference of the region where the thrust dynamic pressure generating groove is provided toward a side of the other of the inner circumference and the outer circumference of the region where the thrust dynamic pressure generating groove is provided.

9. The component according to claim 1, wherein the thrust dynamic pressure generating groove has a boundary in a circumferential direction with a non-concaved portion where no recess is formed, the boundary having a wavy shape.

10. A component for a fluid bearing, the component comprising:
   a cylindrical member comprising (i) a thrust dynamic pressure generating groove which is provided in one end face of the cylindrical member and which generates thrust dynamic pressure, and (ii) a radial dynamic pressure generating groove which is provided in an inner circumferential surface of the cylindrical member;
   wherein:
   the thrust dynamic pressure generating groove comprises a plurality of recesses;
   the plurality of recesses are formed individually by cutting and machining the one end face of the cylindrical member by a machining tool;
   the plurality of individual recesses are disposed on, within a region where the thrust dynamic pressure generating groove is provided, a spiral basal line which turns multiple times in the region where the thrust dynamic pressure generating groove is provided and which has a distance from a center of the cylindrical member gradually increasing for each turn on the one end face of the cylindrical member, the plurality of individual recesses each being disposed on the spiral basal line turn by turn; and
   each of the plurality of individual recesses partially overlaps an adjoining recess from an inner circumference of the region where the thrust dynamic pressure generating groove is provided to an outer circumference thereof.

11. The component according to claim 10, wherein the radial dynamic pressure generating groove is formed as a set of intermittent recesses.

12. The component according to claim 10, further comprising a protrusion which is formed on a bottom of the thrust dynamic pressure generating groove and which runs in a circumferential direction.

13. The component according to claim 10, wherein:
   a second thrust dynamic pressure generating groove is provided in a second end face opposite to the one end face in an axial direction, and
   the second thrust dynamic pressure generating groove comprises a cut-and-machined face.

14. The component according to claim 10, wherein a bottom of the thrust dynamic pressure generating groove has a surface roughness which is measured in a circumferential direction and which is smaller than a surface roughness of the bottom of the thrust dynamic pressure generating groove measured in a radial direction.

15. A disk drive device comprising:
   a base;
   a hub on which a recording disk is mountable and which rotates relative to the base; and
   a fluid dynamic bearing unit that allows the hub to rotate relative to the base;
   wherein:
   the fluid dynamic bearing unit comprises a shaft and a cylindrical member that encircles the shaft, the shaft being configured to perform relative rotation to the cylindrical member;
   the cylindrical member comprises a thrust dynamic pressure generating groove which is provided in one end face of the cylindrical member and which generates thrust dynamic pressure;
   the thrust dynamic pressure generating groove comprises a plurality of recesses;
   the plurality of recesses are formed individually by cutting and machining the one end face of the cylindrical member by a machining tool;
   the plurality of individual recesses are disposed on, within a region where the thrust dynamic pressure generating groove is provided, a spiral basal line which turns multiple times in the region where the thrust dynamic pressure generating groove is provided and which has a distance from a center of the cylindrical member gradually increasing for each turn on the one end face of the cylindrical member, the plurality of individual recesses each being disposed on the spiral basal line turn by turn; and
   each of the plurality of individual recesses partially overlaps an adjoining recess from an inner circumference of the region where the thrust dynamic pressure generating groove is provided to an outer circumference thereof.

16. The disk drive device according to claim 15, wherein:
   the cylindrical member further comprises an inner circumferential surface that retains thereinside the shaft in a manner rotatable relative to the cylindrical member,
   a radial dynamic pressure generating groove that produces radial dynamic pressure is provided in the inner circumferential surface, and
   the radial dynamic pressure generating groove is formed as a set of intermittent recesses.

17. The disk drive device according to claim 15, further comprising a protrusion which is formed on a bottom of the thrust dynamic pressure generating groove and which runs in a circumferential direction.

18. The disk drive device according to claim 15, wherein:
   a second thrust dynamic pressure generating groove is provided in a second end face opposite to the one end face in an axial direction, and
   the second thrust dynamic pressure generating groove comprises a cut-and-machined face.

19. The disk drive device according to claim 15, wherein a of the thrust dynamic pressure generating groove has a surface roughness which is measured in a circumferential direction and which is smaller than a surface roughness of the bottom of the thrust dynamic pressure generating groove measured in a radial direction.

20. The disk drive device according to claim 15, wherein the thrust dynamic pressure generating groove has a boundary in a circumferential direction with a non-concaved portion where no recess is formed, the boundary having a wavy shape.

* * * * *